US006314425B1

(12) United States Patent
Serbinis et al.

(10) Patent No.: US 6,314,425 B1
(45) Date of Patent: Nov. 6, 2001

(54) APPARATUS AND METHODS FOR USE OF ACCESS TOKENS IN AN INTERNET DOCUMENT MANAGEMENT SYSTEM

(75) Inventors: M. Michael Serbinis; Evan V Chrapko, both of Toronto (CA)

(73) Assignee: Critical Path, Inc., San Francisco, CA (US)

( * ) Notice: Subject to any disclaimer, the term of this patent is extended or adjusted under 35 U.S.C. 154(b) by 0 days.

(21) Appl. No.: 09/375,908

(22) Filed: Aug. 17, 1999

Related U.S. Application Data

(63) Continuation-in-part of application No. 09/288,064, filed on Apr. 7, 1999.

(51) Int. Cl.[7] ................................................. G06F 17/30
(52) U.S. Cl. ............................ 707/10; 707/104; 707/501; 707/513; 705/8; 705/26; 709/218; 709/224; 711/121; 713/200
(58) Field of Search ............................ 707/10, 513, 103, 707/104, 552, 1; 705/26, 27, 8; 709/218, 217, 226, 206, 207, 224, 238; 713/200, 201; 345/331; 710/129; 711/121, 122; 358/468, 442

(56) References Cited

U.S. PATENT DOCUMENTS

| | | | |
|---|---|---|---|
| 4,289,930 | 9/1981 | Connolly et al. | 179/2 |
| 4,532,588 | 7/1985 | Foster | 364/200 |
| 4,816,653 | 3/1989 | Anderl et al. | 235/380 |
| 4,837,798 | 6/1989 | Cohen et al. | 379/88 |
| 5,008,853 | * 4/1991 | Bly et al. | 345/331 |
| 5,167,011 | 11/1992 | Priest | 395/54 |
| 5,241,594 | 8/1993 | Kung | 380/4 |
| 5,247,661 | 9/1993 | Hager et al. | 395/600 |
| 5,276,869 | 1/1994 | Forrest et al. | 395/600 |
| 5,293,250 | 3/1994 | Okumura et al. | 358/402 |
| 5,297,208 | 3/1994 | Schlafly et al. | 380/49 |
| 5,355,472 | 10/1994 | Lewis | 395/600 |
| 5,367,621 | 11/1994 | Cohen et al. | 395/154 |

(List continued on next page.)

OTHER PUBLICATIONS

Arnold–moore, Tim et al., "Architecture of a Content Management Server for XML Document Applications", Proceedings of the First International Conference on Web Information Systems Engineering, Jun. 19–21, 2000, vol. 1, pp. 97–108.*

(List continued on next page.)

*Primary Examiner*—Hosain T. Alam
*Assistant Examiner*—Shahid Alam
(74) *Attorney, Agent, or Firm*—Fish & Neave; Michael J. DeHaemer, Jr.

(57) ABSTRACT

An Internet-based document management system and methods are provided wherein access to the system and its services may be controlled through use of access tokens. The Internet-based document management system allows an electronic document to be stored on an Internet-accessible server and accessed using a previously known web browser, downloaded for review or manipulation, and then returned to the server for access by further users. The server is programmed to generate and validate access tokens and provide a plurality of services supported by a common database and document store, including storage and retrieval services, an electronic document delivery service, a document distribution service, a collaborative file sharing service and a workflow service. The system preferably also is programmed with a security function, a filtering function, accounting functions that enable detailed accounting of transactions occurring on the system, and a customization function that permits multiple service providers to utilize the common document management services of a server, while presenting end-users with distinct dedicated websites.

20 Claims, 14 Drawing Sheets

U.S. PATENT DOCUMENTS

| | | | |
|---|---|---|---|
| 5,379,374 | | 1/1995 | Ishizaki et al. ............... 395/155 |
| 5,406,557 | | 4/1995 | Baudoin ........................ 370/61 |
| 5,424,724 | | 6/1995 | Williams et al. ............ 340/825.05 |
| 5,479,411 | | 12/1995 | Klein ........................... 370/110.1 |
| 5,483,466 | | 1/1996 | Kawahara et al. ............... 364/514 |
| 5,509,000 | * | 4/1996 | Oberlander .................... 370/409 |
| 5,513,323 | | 4/1996 | Williams et al. ............ 395/200.18 |
| 5,544,320 | | 8/1996 | Konrad ...................... 395/200.09 |
| 5,552,901 | * | 9/1996 | Kikuchi et al. ............... 358/468 |
| 5,675,507 | | 10/1997 | Bobo, II ...................... 364/514 |
| 5,677,955 | | 10/1997 | Doggett et al. ............... 380/24 |
| 5,768,528 | | 6/1998 | Stumm ........................ 395/200.61 |
| 5,781,901 | | 7/1998 | Kuzma ........................ 707/10 |
| 5,787,175 | | 7/1998 | Carter ......................... 380/25 |
| 5,790,790 | | 8/1998 | Smith et al. ................. 395/200.36 |
| 5,790,793 | | 8/1998 | Higley ........................ 395/200.48 |
| 5,819,295 | | 10/1998 | Nakagawa et al. ............. 707/203 |
| 5,835,908 | * | 11/1998 | Bennett et al. ................ 707/10 |
| 5,878,398 | * | 3/1999 | Tokuda et al. ................ 705/8 |
| 5,892,900 | * | 4/1999 | Ginter et al. ................. 713/200 |
| 5,893,908 | | 4/1999 | Cullen et al. ................. 707/5 |
| 5,960,085 | | 9/1999 | de la Huerga ................. 380/25 |
| 6,009,442 | * | 12/1999 | Chen et al. ................... 707/522 |
| 6,021,262 | * | 2/2000 | Cote et al. ................... 714/48 |
| 6,029,175 | * | 2/2000 | Chow et al. .................. 707/104 |
| 6,035,332 | | 3/2000 | Ingrassia, Jr. et al. ......... 709/224 |
| 6,038,561 | * | 3/2000 | Snyder et al. ................. 707/6 |
| 6,038,601 | * | 3/2000 | Lambert et al. ............... 709/226 |
| 6,044,372 | * | 3/2000 | Rothfus et al. ................ 707/10 |
| 6,055,530 | | 4/2000 | Sato ............................. 707/3 |
| 6,088,702 | * | 7/2000 | Plantz et al. ................. 707/103 |
| 6,151,598 | * | 11/2000 | Shaw et al. ................... 707/3 |
| 6,157,926 | * | 12/2000 | Appleman et al. ............. 707/102 |

OTHER PUBLICATIONS

Matyszkiel, Robert , "Implementation Of Universal Document Servers To Transfer Management Information in Tactical Network", IEEE Military Communications Conference Proceedings, MILCOM 1999, vol. 1, Oct. 31–Nov. 3, 1999, pp. 502–505.*

Kowarschick, Wolfgang et al., "Elektra: An Electronic Article Delivery Service", Proceedings of the Eighth International Workshop on Database and Expert System Applications, Sep. 1–2, 1997, pp. 272–277.*

Wolstenholme, David, "Web and Exchange in BP's Internet", 1997 The Institute of Electrical Engineers, IEE, Savoy Place, London WC2R 0BL, UK.*

Baudoin, Claude R., *The Sematech Electronic Mail System*, Proceedings of the digital Equipment Computer Users Society, pp. 221–231 (U.S.A., Spring 1989).

Borenstein, Nathaniel et al., *A Multi–media Message System for Andrew*, USENIX Winter Conference, Dallas, TX, pp. 37–42 (Feb. 9–12, 1988).

Donahue, James et al., *Walnut: Storing Electronic Mail in a Database*, Xerox Park, CSL–85–9, (Nov. 1985).

Hofrichter, K. et al., *The BERKOM Multimedia–Mail Teleservice*, Proceedings of the Fourth Workshop on Future Trends of Distributed Computing Systems, Lisbon, Portugal, pp. 23–30 (Sep. 22–24, 1993).

Kent, Jack et al., *Browsing Electronic Mail: Experiences Interfacing a Mail System to a DBMS*, Proceedings of the Fourteenth International Conference on Very Large Data Bases, Los Angeles, CA, pp 112–123 (1988).

Moeller, Eckhard et al., *The BERKOM multimedia–mail teleservice*, Computer Communications, vol. 18:2, pp. 89–102 (Feb. 1995).

Pan, Jeff, *Internet Security & Firewall Issues for NIIIP Virtual Enterprise*, NIIIP OMB Meeting, Boca Raton, FL (Jan. 23–25, 1996).

Poggio, A. et al., *CCWS: A Computer–Based, Multimedia Information System*, Multimedia Communications, pp. 92–103 (Oct. 1985).

Reinhardt, Andy, *Smarter E–Mail Is Coming*, Byte Magazine, pp. 90–108 (Mar. 1993).

Rosenberg, Jonathan et al., *An Overview of the Andrew Message System*, Computer Communications Review, vol. 17:5, pp. 99–108 (Apr. 1988).

Sakata, Shiro et al., *A Distributed Interoffice Mail System*, Multimedia Communications, pp. 106–116 (Oct. 1985).

Vaughan–Nichols, Steven J., *Internet Publishing Tools Proliferate*, Byte Magazine (Mar. 1995).

*Microsoft Messaging Application Pro Interface (MAPI)*, www.mmicrosoft.com/win32dev/apiext/mapiwp.html.

*Novell Announces "Softsolutions 4.1"*, PR Newswire, New Orleans, LA (May 9, 1995).

*How Posta Works*, www.tumbleweed.com/posta/posta_overview.html.

*Overview of the Trans–Virtual Enterpriser Server*, Product Overview.

* cited by examiner

APPARATUS AND METHODS FOR USE OF ACCESS TOKENS IN AN INTERNET DOCUMENT MANAGEMENT SYSTEM

REFERENCE TO RELATED APPLICATIONS

This application is a continuation-in-part of U.S. patent application Ser. No. 09/288,064, filed Apr. 7, 1999.

FIELD OF THE INVENTION

This invention relates to apparatus and methods for use of access tokens in a system for managing electronic documents over open networks, such as the Internet, to permit users to store, retrieve, and collaboratively manipulate files.

BACKGROUND Of THE INVENTION

Document management systems are known that permit multiple users to store and retrieve electronic documents on a closed client/server architecture network, such as a local area network or wide area network. These previously known document management systems, such as DOCSFusion, available from PCDOCS, Inc., Toronto, Ontario, Canada and EDMS 98, available from Documentum, Inc., Pleasanton, Calif., require the presence of a client application on each node of the network that is to access and manipulate files.

With the recent rapid expansion of the Internet, the opportunity for collaborative efforts has increased many fold, as colleagues scattered around the world can rapidly transmit files for review and revision using electronic mail facilities. While electronic mail systems are useful for transmitting relatively small files on the Internet, however, large documents often are too large to be handled by typical message transfer systems, and can overburden a network. Large documents also may exceed the available storage at a recipient's site, thus preventing a recipient from storing a received document. Electronic mail systems used on open systems, such as the Internet, also do not generally address security concerns, or permit a transmission to be tracked, as is possible with a physical document delivery service (e.g., courier).

Smith U.S. Pat. No. 5,790,790 describes an Internet electronic document delivery system, wherein an e-mail message contains a direct reference (i.e., a Uniform Resource Locator or "URL") to an electronic document stored on a server. When a recipient receives the e-mail message, the direct reference is used to access the document. A drawback of the system described in that patent, is that the sending computer must include a specialized client application for interacting with the server. The system described in that patent also lacks the kinds of transaction logging and accounting functions needed to provide a useful document management system.

The POSTA® system, offered by Tumbleweed Software Corporation, Redwood City, Calif., overcomes some of the drawbacks of the system described in the foregoing patent. For example, the POSTA® system eliminates the need for specialized client software for basic document delivery operations, and permits the use of a previously known web browser, such as Internet Explorer 4.0®, available from Microsoft Corp., Redmond, Wash., or Netscape Navigator®, Netscape Corporation, Mountain View, Calif. That commercial system also eliminates use of the direct reference in the e-mail message, instead providing a URL for a webpage that provides the user with several options for document delivery. The system provides none of the capabilities normally associated with a document management system.

Higley U.S. Pat. No. 5,790,793, like the foregoing Smith patent, also describes an Internet electronic document delivery system wherein an e-mail message includes a URL reference to a document stored in a server. This system described in this patent also requires the use of a specialized client application, and is limited to an electronic document delivery service.

While it is known in the art to use an Internet web browser to download an electronic document from a website, using, for example, Hyper Text Transfer Protocol ("HTTP") or File Transfer Protocol ("FTP"), there currently do not exist document management systems that permit such a file to be modified by a user, and uploaded to the system for further collaborative retrieval and modification by others.

It is also known in the art to use access tokens as a security feature in computer systems, i.e., to provide information and assurances about the identity of a user and to accordingly restrict a user's access to a resource (data that the user is trying to access, e.g., a document, a message, etc.). Moreover, different types of access tokens are also known in the art, e.g., private URLs (URLs which contain a reference to the identity of the user who is authorized to access the URL) are a type of URL which contains an access token, user information and resource information (identifiable information on the data that the user is trying to access). The access token in a private URL is often a string generated from information on the user and/or resource. For security purposes, it would be desirable to generate access tokens that are not derived from any information on the user and/or resource. However, there currently does not exist a system, which provides for the construction of URLs comprising access tokens that are not derived from user or resource information, and the methods of using such access tokens in an Internet-based document management system to control a user's access to the various document management services.

In view of the foregoing, it would be desirable to provide a document management system and methods that permit electronic documents to be made available for use on open systems, such as the Internet, and to be accessed using a previously known web browser—without the need for a specialized client application.

It also would be desirable to provide an Internet-based document management system and methods that permit users to access a plurality of services supported by a common Internet-based database, including document storage, collaborative file sharing and workflow, document delivery and document distribution.

It further would be desirable to provide an Internet-based document management system and methods that permit users to selectively or automatically filter electronic documents during storage to and/or retrieval from, an Internet-based storage site.

It still further would be desirable to provide an Internet-based document management system and methods that permit users to collaboratively store, retrieve, modify and then return an electronic document to an Internet-based storage site.

It yet further would be desirable to provide an Internet-based document management system and methods that enable the transaction logging and accounting functions needed for multi-user collaborative electronic document manipulation, for example, so that revisions to a document may be tracked.

It also would be desirable to provide an Internet-based document management system and methods that enable tracking of transactions performed on a document for billing purposes, and which provide needed access-control protocols, for example, so that specific users' privileges with respect to a document may be defined.

It further would be desirable to provide a system for the construction and validation of access tokens for use in an Internet-based document management system, where the access tokens are not derived from user or resource information and can be used to control access to the services offered by the document management system.

SUMMARY OF THE INVENTION

In view of the foregoing, it is an object of this invention to provide a document management system and methods that permit electronic documents to be made available for use on open systems, such as the Internet, and to be accessed using a previously known web browser—without the need for a specialized client application.

It also is an object of the present invention to provide an Internet-based document management system and methods that permit users to access a plurality of services supported by a common Internet-based database, including document storage, collaborative file sharing and workflow, document delivery and document distribution.

It is a further object of this invention to provide an Internet-based document management system and methods that permit users to selectively or automatically filter electronic documents during storage to and/or retrieval from, an Internet-based storage site.

It is another object of the present invention to provide an Internet-based document management system and methods that permit users to collaboratively store, retrieve, modify and then return an electronic document to an Internet-based storage site.

It is a further object of this invention to provide an Internet-based document management system and methods that enable the transaction logging and accounting capabilities needed for multi-user collaborative electronic document manipulation, for example, so that revisions to a document may be tracked.

It is a still further object of the present invention to provide an Internet-based document management system and methods that enable tracking of transactions performed on a document for billing purposes, and which provide needed access-control protocols, for example, so that specific users' privileges with respect to a document may be defined.

It is yet another object of this invention to use access tokens to control a user's access to services offered by an Internet-based document management system, in which the access tokens are derived from random numbers independent of user or resource information, thereby providing for enhanced security of the Internet-based document management system.

These and other objects of the present invention are accomplished by providing an Internet-based document management system and methods wherein an electronic document may be stored on an Internet-accessible server and accessed using a previously known web browser, downloaded for review or manipulation, and then returned to the server for access by further users. The server is programmed with several routines that perform numerous functions, referred to hereinafter as "services," that provide a full-featured document management system. In accordance with the principles of the present invention, the server is programmed to generate access tokens, derived from random numbers independent of user or resource information, and these tokens are used to limit a user's access to the services provided by the document management system.

In a preferred embodiment, the document management system is programmed to provide a plurality of services supported by a common database and document store. These services preferably include storage and retrieval services to and from an Internet-based storage site, an electronic document delivery service, a collaborative file sharing service and a workflow service, and a document distribution service. The server also preferably is programmed to generate access tokens from random numbers, and verify access tokens as a security function, to verify or define a requestor's ability to access an electronic document, a filtering function that performs selective or automatic filtering of documents during storage to and/or retrieval from the storage site, and accounting functions that enable detailed accounting of, for example, usage of storage on the server, number of accesses, etc. In addition, the system may permit multiple service providers to utilize common document management services of a server, while appearing to end-users as separate dedicated websites.

BRIEF DESCRIPTION OF THE DRAWINGS

The above and other objects and advantages of the invention will be apparent upon consideration of the following detailed description, taken in conjunction with the accompanying drawings, in which like references refer to like parts throughout, and in which.

DETAILED DESCRIPTION OF THE INVENTION

The present invention is directed to apparatus and methods for the use of access tokens in a system for managing electronic documents over the Internet. Specifically, the present invention comprises an Internet-accessible server programmed to generate access tokens and provide a plurality of document management services, including document storage and retrieval, collaborative file sharing and workflow services for electronic documents, an electronic document delivery service, and a document distribution service. As used herein, the term "access token" refers to a security code used to restrict a user's access to the DMS system of the present invention, which access token is comprised of a signed string, unique to a transaction and generated from one or more random numbers independent of any user information or resource information or any other identifiable information. Further, in accordance with the principles of the present invention, these services are supported by a common database system that is used to validate access tokens and permits interfaces to the multiple services to be accessed using previously known web browsers, and without a specialized client application.

System Architecture

Figure 1A:
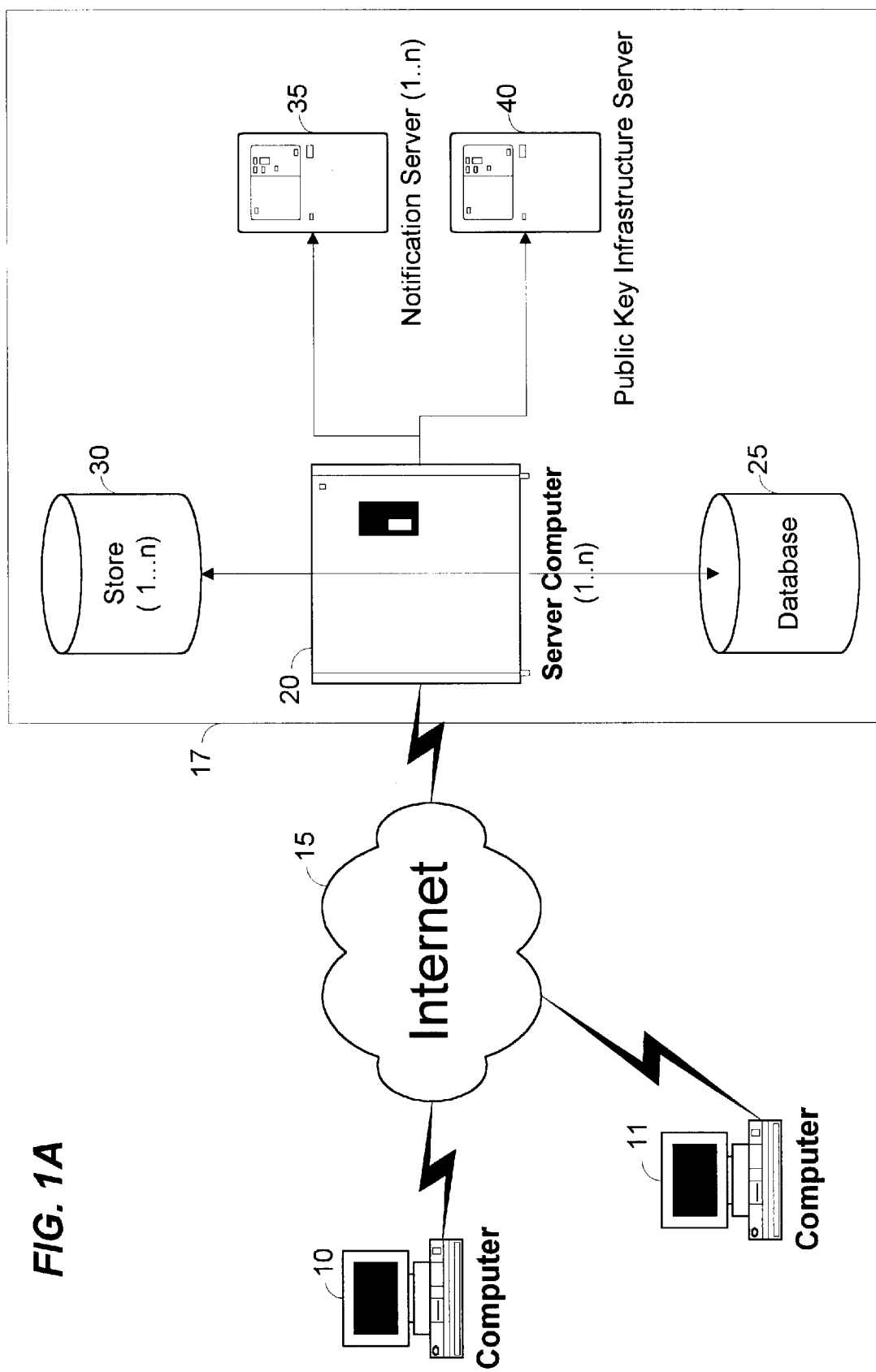
FIGS. 1A and 1B are block diagrams illustrating the architecture of a document management service (DMS) system constructed in accordance with the principles of the present invention.
Figure 1B:
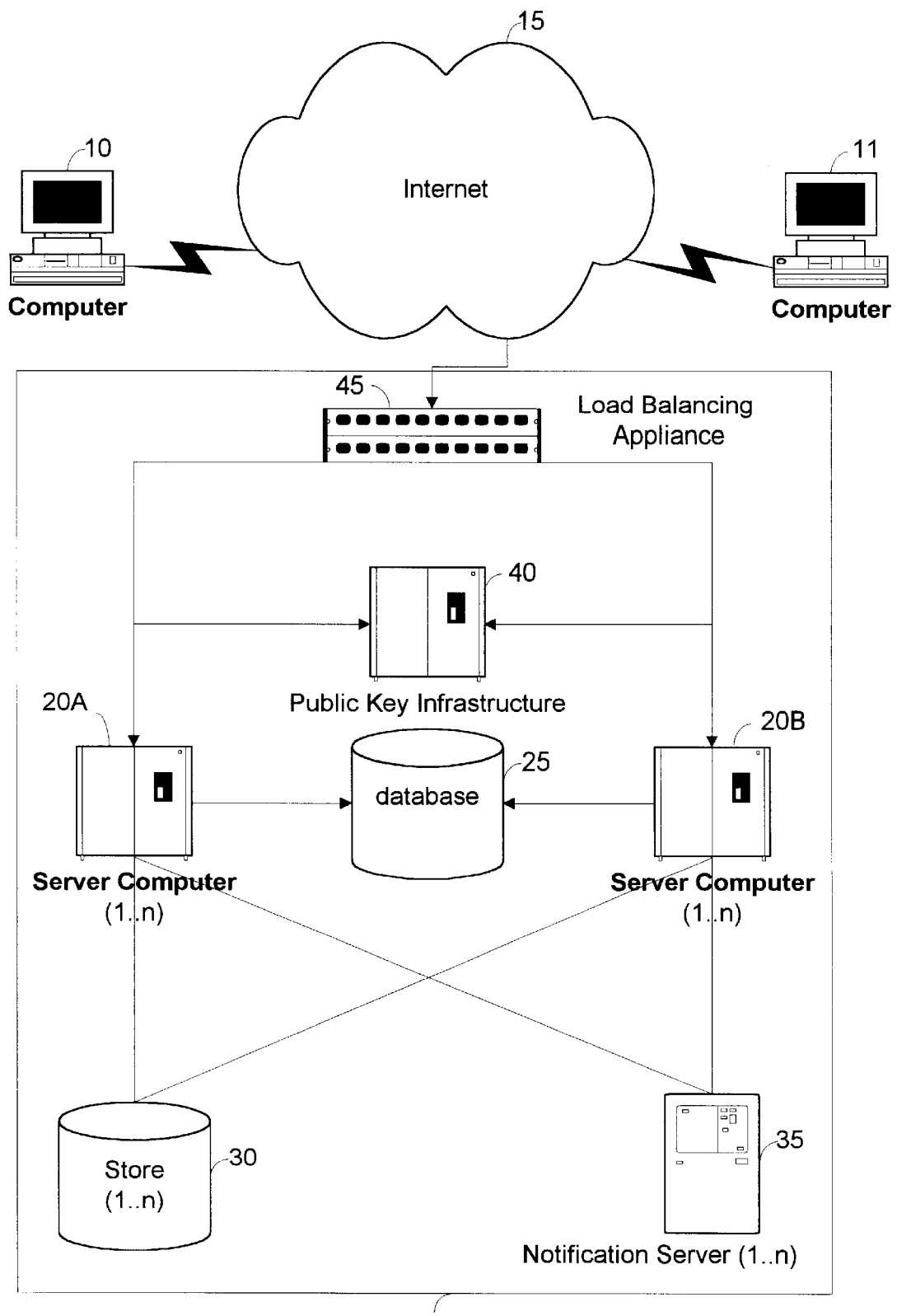

Referring to FIGS. 1A and 1B, illustrative architecture suitable for implementing the system and methods of the present invention is described. In FIGS. 1A and 1B, this architecture comprises personal computers 10 and 11 coupled through an open network, such as Internet 15, to document management services ("DMS") system 17. DMS system 17 comprises server computer 20, which in turn, comprises or is coupled to DMS database 25, store 30, notification server 35 and public key infrastructure server 40.

Personal computers 10 and 11 are connected using dedicated lines or dial-up connections to the public standard telephone network ("PSTN") to an open network, such as Internet 15. While Internet 15 is depicted as a single entity, it will of course be understood that Internet 15 comprises a myriad of computer networks connected by bridges, routers, etc., and is constantly evolving. As defined herein, the term "Internet" refers not only to the Internet in its present form, but also encompasses changes, additions and future embodiments of the Internet. Each of personal computers 10 and 11 preferably is connected to Internet 15 through an Internet Service Provider ("ISP"), and includes a web browser, such as the aforementioned Internet Explorer 4.0® or Netscape Navigator®. Personal computers may be standalone computers, or may be connected to the Internet through a local area network (not shown). Personal computers 10 and 11 may be IBM personal computers (or any other type of computer), or take the form of other devices capable of establishing a connection to the Internet, including TV set-top boxes, handheld devices, Personal Digital Assistants (PDAs) or cellular telephones.

Server computer 20 is coupled to, and communicates asynchronously with, Internet 15, and includes a domain-specific digital certificate to enable secure communications. Server computer 20 preferably is programmed as a web server, e.g., to run Hyper Text Transfer Protocol ("HTTP") and with Document Management Services ("DMS") system software constructed in accordance with the present invention. In a preferred embodiment, the DMS software of the present invention runs on the web server through a Common Gateway Interface (CGI).

This enables DMS system 17 to interact with users through a web browser, rather than requiring specialized client software. In particular, a user enters information into a form displayed in a web browser. The information is transferred to server computer 20 using HTTP, and is made available to the programmed routines executing on server computer 20 through the CGI. Alternatively, the DMS software of the present invention may be implemented as "servlets," i.e., routines, typically written in the Java programming language, that run on a web server. Use of servlets also permits users to interact with DMS system 17 through a web browser.

While the present invention is described in the context of web browsers running on personal computers to access the DMS system, other devices and software may be used. In general, any software capable of communications with the DMS system, and of displaying web pages may be used to access the DMS system. Additionally, as used herein, the term "web browser" includes previously known browsing software, as well as "applets", such as Java applets, that may be downloaded from the DMS system, and temporarily executed within the context of the web browser.

Database 25, which may be a relational database, stores: data concerning documents controlled by server computer 20 and stored in store 30 (hereinafter, referred to as "metadata"), such as annotations, instructions, characteristics, etc.; user and account data; transaction data; notification data; and authorization data, all as described in greater detail hereinafter. Database 25 may be implemented on server computer 20 or on a separate computer connected to server computer 20.

Store 30 is connected to server computer 20 and stores electronic documents (or "files"). Store 30 provides a storage mechanism for storing electronic documents, and may comprise one or more hard drives, 30 optical drives, RAIDs, etc., and further may comprise one or more stores supporting different types of storage media. Store 30 also may comprise remote storage, in which the file is stored on a remote DMS server. If multiple stores are used, DMS system 17 preferably includes a configurable algorithm to decide in which store a document will be placed, thereby evenly distributing document storage among all stores.

Store 30 preferably comprises either a relational database, where the electronic documents and information about the document is stored in the relational database, or a file system. If store 30 comprises a relational database, a unique key to the document is generated and indexed, as may be appropriate for storage of smaller files (e.g., <1 KB). If store 30 comprises a relational database, then entries in the relational database may include a storage type, a storage path (i.e., a description of location), a name, a maximum size and a state value. When store 30 comprises more than one store, the state value for each store may be set to "active" or "inactive" and documents cannot be stored in an "inactive" store. If store 30 comprises file system storage, the file system may assign a unique name to each document and the document is stored directly on the hard drive, optical drive, etc., as may be appropriate for large files.

Notification server 35, which may comprise software running on server computer 20 or on one or more separate computers connected to server computer 20, dispatches notifications, e.g., via voice message, e-mail, pager, etc., to users of DMS system 17 concerning the status of documents stored in the DMS system. Public key infrastructure server 40 ("PKI"), which also may comprise software running on server computer 20 or on one or more separate computers connected to server computer 20, provides digital certificates to users of the DMS system. The digital certificates may be used by the users to digitally sign documents for the purpose of non-repudiation.

DMS system 17 of FIG. 1A illustratively is depicted as having a single server computer 20, but also may comprise multiple server computers for use in high load scenarios. As shown in FIG. 1B, when more than one server computer is used, load balance appliance 45 may be employed to balance traffic between server computers 20A and 20B. Load balance appliance 45 may comprise software running on the server computers 20A and 20B. Alternatively, load balance appliance 45 may comprise software running on a separate computer (not shown), which is in turn connected to server computers 20A and 20B.

Figure 2:
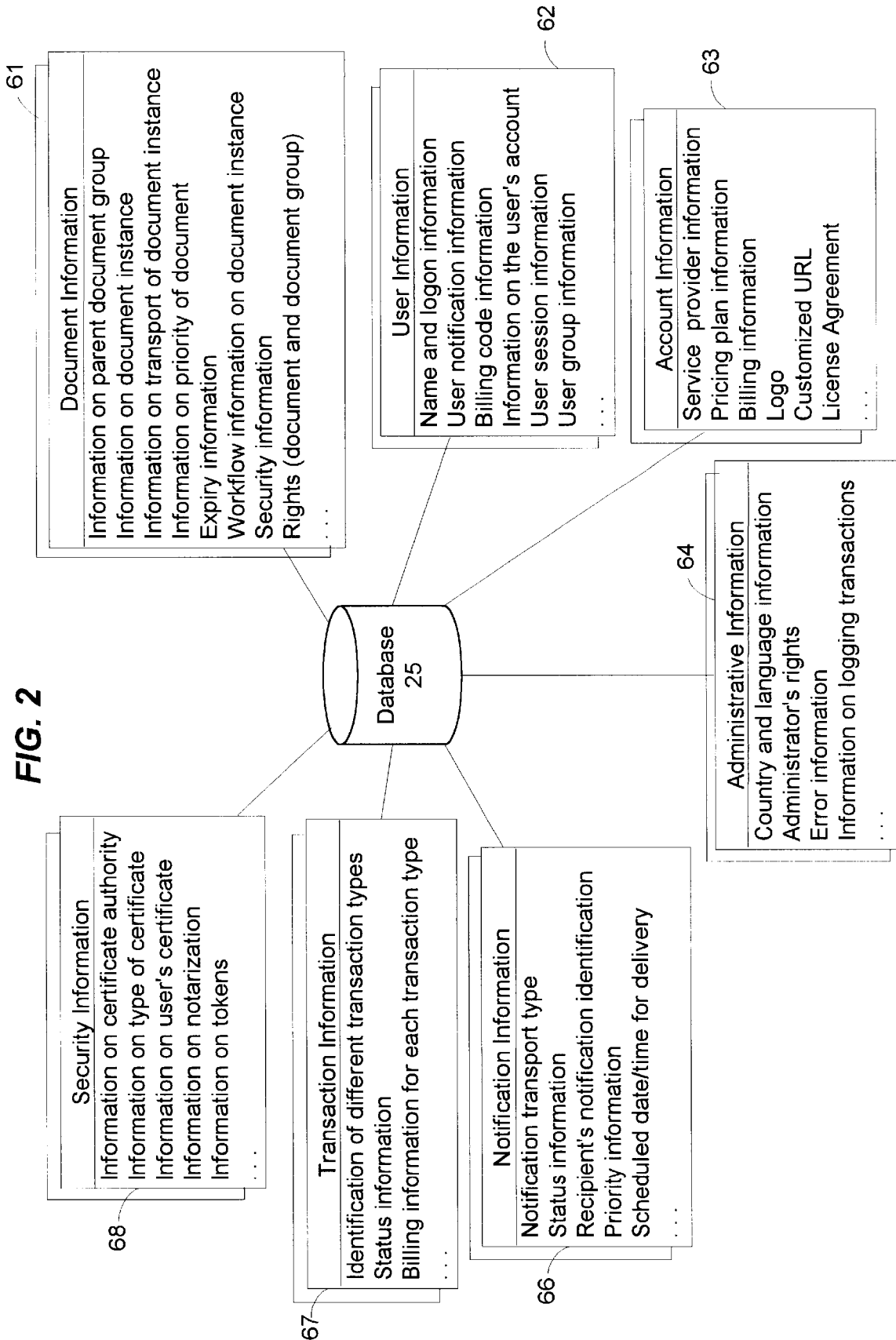
FIG. 2 is a schematic diagram of the components of DMS database 25 of the present invention.

Referring to FIG. 2, DMS database 25 is described in greater detail. Database 25 includes a plurality of tables 61–64 and 66–68 that maintain information on documents stored in store 30. Each of tables 61–64 and 66-68 may in turn consist of multiple tables.

Document information tables 61 have entries for a number of document-related parameters, including: information on a document's parent document group; information on the document instances; information on the transport method to be used for retrieval of a document instance; information on the priority of the document; expiration information: the date and time when a document instance is changed from "active" status to "archived" status; workflow information for a document instance; security information; document rights; and document group rights.

User information tables 62 have entries for information relating to users registered to access and use the DMS system, including: the name of the user; logon information for the user, e.g., user ID and password; user notification information, e.g., notification address and transport type; billing code information; information on the user's account, where each user account is unique to a service account and user; user session information; and user group information, i.e., information on the group of users that the user is a part of, including the name of the group, the state of the group, the group's security information, and document rights for the group.

The security information and document rights information from document information tables 61 and user information tables 62 is used to determine a user's access rights to the services of, and to documents stored in, the DMS system.

Account information tables 63 have entries for information relating to users registered to access and use the DMS system, including: service provider identification; pricing plan for each service provider; and billing information such as the user's credit card number and the billing format (e.g., monthly); an optional customized URL for each service provider; a logo for each service provider, to customize the user interface; and license agreement information so that a service provider can customize the license agreement between the service provider and users.

Administrative information tables 64 have entries that enable a registered user to review and track activity for a user's account, including: information on the system administrator's rights; information on logging errors; information on logging transactions; and country and language information (e.g., for a system running in the United States, the default language is English).

Notification information tables 66 maintain information necessary to generate a notification message, and include entries for: notification transport type, i.e., e-mail, facsimile, voice, or pager; information on the status of the notification, i.e. pending, sent, failed; the recipient's notification identification; priority information; and optionally, the scheduled date/time for delivery.

Transaction information tables 67 record data relating to each transaction occurring on the DMS system, and include: the identification of different transaction types; status information for each transaction; and billing information for each transaction type.

Security information tables 68 include entries for security-related parameters, such as: the names of Certificate Authorities, i.e., trusted third-party organizations that issue digital certificates (an attachment to an electronic message used for security purposes); information on different types of digital certificates; information on Authorized User certificates; notarization information; and information necessary to create and validate access tokens.

Figure 3:
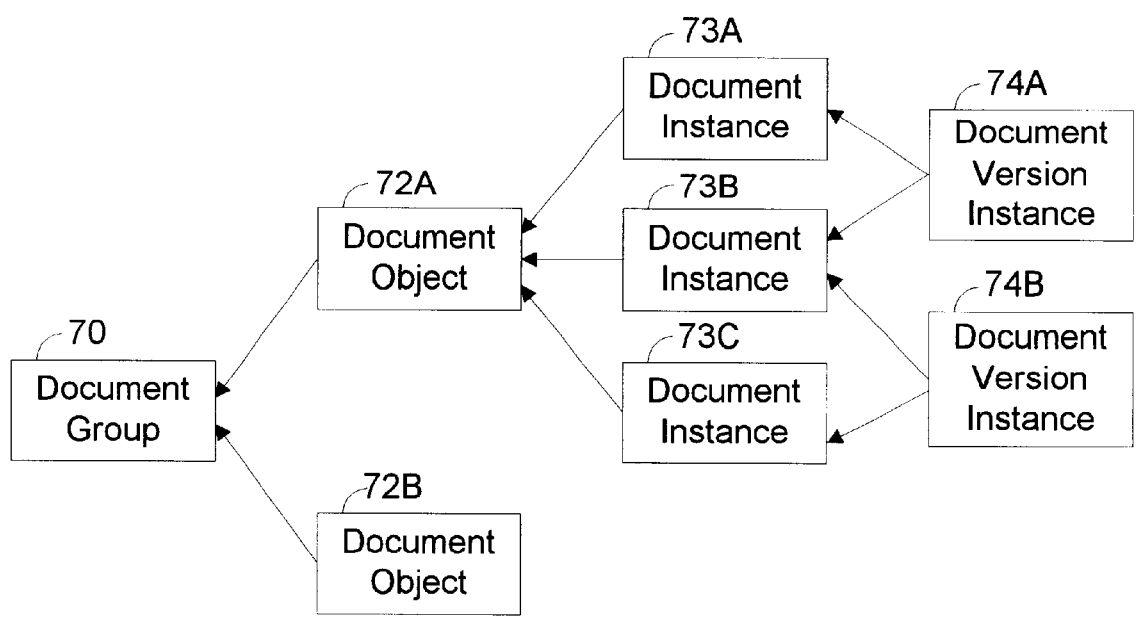
FIG. 3 depicts an illustrative hierarchy for storage of information on electronic documents in database 25.

Referring now to FIG. 3, an illustrative hierarchical storage scheme for storing information on electronic documents in database 25 is described. Each user of DMS system 17 preferably has access to one or more document groups 70, where each document group comprises a collection of document objects 72A and 72B. One document may belong to one, many or no document groups. Each document group 70 has a name, a description, and a service defined type for defining the document type (e.g., word processing file). A document group may have one or more parent document groups. The document groups preferably have extensible property types.

Document objects 72A and 72B represent a generalized high level description of a document, and include a document name, document type, description, expiry date, document state, account ID, billing code ID and document ID. Document objects also may have extensible property types.

Document instances 73A, 73B and 73C correspond to specific instances of a document, and each include details about the document, a reference to the document stored in Store 30, a parent document object ID, a type, account ID, billing code ID, a document state, document instance ID, description, size, priority, and encryption type. The default document states are "pending," "active," "archived" and "deleted." Document states are extensible by service. A document state log is kept to track when a document instance has changed state, as described hereinbelow.

DMS system 17 also preferably supports multiple versions of documents, for example, versions 74A and 74B. A document version object is employed in document information tables 61 of database 25 and is used to maintain version relationships between document instances of a given document. Each document version instance 74A and 74B includes a reference to the parent and child document instance, a version name and a unique version ID.

Document records are created in DMS database 25 the first time a new document is stored on DMS system 17. Document instance records are created when new documents or new versions of existing documents are stored to the DMS system. Each version or instance of a document is stored as a separate electronic document, or file, in Store 30. Document group records may be created when logical collections of documents are stored at the same time and it is desired to maintain the relationship between the documents. Also, according to the authorization information submitted by a document originator, new document rights, document group rights and document instance rights are created for the document. A document store record references a document instance and a store and includes a unique key/name to the document's storage location.

In a preferred embodiment, documents stored in the DMS system are monitored by a document state process that automatically modifies the state of a document instance based on its current state, the active date/time, and expiration date/time. States for a document instance include "pending," "active," "archived," "canceled" and "deleted." Each default state change in a document instance is logged to the DMS database, and may result, for example, in a billable transaction.

Document instances with a "pending" state have an active date/time that specifies the time at which the state of the document instance should be changed to "active." A "pending" document is not available to anyone except the Originator.

Document instances marked "active" are accessible by all Authorized Users. If a document instance has an expiration time, then the status is changed from "active" to "archived" when the expiration time is reached. At this point, document instance rights are removed for all Authorized Users except the Originator.

Document instances marked "archived" are accessible only to the Originator. The state of these documents is changed to "deleted" after a predetermined amount of time. At this time, the electronic document (physical file) corresponding to the document instance is removed/deleted from storage and the corresponding document store record is deleted. Document instances marked deleted are only available for tracking and billing purposes. These document instances are removed from DMS database 25 only when the corresponding transaction log is billed and removed from database 25.

Document instances are marked "canceled" when an Authorized User (typically the Originator) forces a document to expire before the expiration time. Canceled document instances then are treated like archived document instances.

DMS system 17 also may provide a notarization feature, where each document instance is notarized by the DMS system. A digital notarization is used to authenticate an identifiable set of data at a given time. A simple notarization scheme, for example, involves creating a digital fingerprint (or digest) of a document, by using a one-way hashing algorithm, adding a timestamp, and then signing the resulting data with a private key. DMS system 17 may be configured to support multiple notarization schemes by assigning a notarization type to each digital notarization. A digital notarization object may be created, containing a reference to a document, document instance, document group, notification or transaction.

Document Storage And Retrieval Processes

Figure 4:
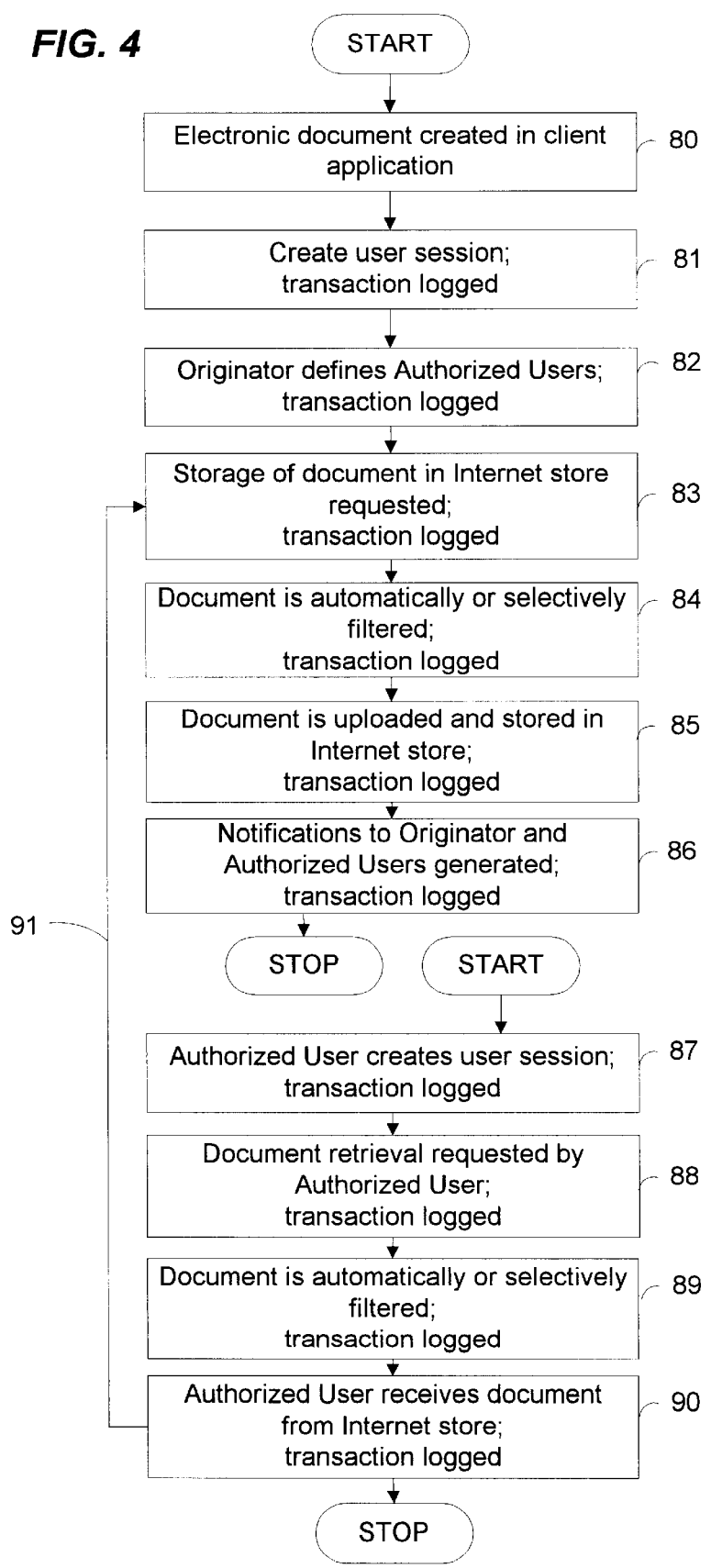
FIG. 4 is a simplified flowchart depicting the steps of using the document management capabilities of DMS system 25 of the present invention.

Referring now to FIG. 4, the basic processes of storing and retrieving an electronic document to DMS system 17 are described. The series of basic steps described with respect to FIG. 4 involve interaction between an Originator's computer (e.g., personal computer 10), DMS system 17, and one or more Authorized Users (e.g., personal computer 11). Each of the services provided by DMS system 17 includes one or more of the steps depicted in FIG. 4, and in accordance with the present invention, each of those steps may involve performing further functions, such as filtering and accounting functions, specific to a particular service. In accordance with the principles of the present invention, billable services are made available on DMS system 17 to a specific user, singly or in combination, by one or more service providers. Preferably, each of the steps described in FIG. 4 is performed using secure protocols.

FIG. 4 is now illustratively described in overview with respect to a collaborative file sharing service of DMS system 17. In this service, an electronic document to be stored is created by an Originator using a previously known word processing, image or spreadsheet client application, and then uploaded and stored in DMS system 17. The electronic document then may be retrieved by one or more Authorized Users, as defined by the Originator during the storage process. After an Authorized User has modified the document, it is returned to store 30 of the DMS system. In accordance with the principles of the present invention, each transaction involving the document is logged in the transaction tables of DMS database 25, for example, for billing, reporting, and tracking purposes.

More particularly, at step 80, an Originator uses a previously known client application, such as a word processing, image generation application, spreadsheet, etc., to create an electronic document. Illustratively, the document may consist of a business plan and appendices for a start-up company. The Originator then connects to the Internet using his or her web browser and enters the URL for the DMS system. Once connected to the DMS system website, at step 81, the Originator initiates a user session with DMS system 17 using a logon process, described hereinbelow.

The Originator then fills out appropriate forms indicating a desire to upload the previously created electronic document to the DMS system, and at step 82 defines a list of Authorized Users who may access the document. The Originator specifies the types of access that each Authorized User is to receive, and metadata concerning the document (e.g., expiration date, etc.). Thus, for example, some Authorized Users may be granted access only to retrieve and review a document, while others are granted access to retrieve and modify the document. The specific access rights granted to each Authorized User are recorded in the document tables of DMS database 25, and the transaction is logged in the transaction tables of DMS database 25.

At step 83, the Originator requests that the document be uploaded and stored in store 30 of the DMS system. Appropriate records are generated in the document tables of DMS database 25, and the transaction is logged in the transaction tables of DMS database 25. At step 85, the document is uploaded, for example, using HTTP or FTP, and stored in store 30. During the upload process, at step 84, the document optionally may be automatically or selectively filtered in accordance with routines appropriate for the service being performed. For example, the document may be automatically compressed or encrypted, or at the Originator's request, converted to a particular file format suitable for the Authorized Users (e.g., converted from WordPerfect® to Microsoft Word). Other forms of filtering may include formatting, translating or virus checking. Both the storage and filtering step, if performed, are logged to the appropriate tables in DMS database 25.

At step 86, notification server 35 generates notification messages to the Authorized Users informing those Users that the document is available in store 30. The notification server also may provide a notification to the Originator that the notifications to the Authorized Users have been sent or delivered, as described hereinbelow with respect to FIGS. 12A and 12B. Issuance of any notifications to the Originator and Authorized Users are logged in the Notification tables and Transaction tables of DMS database 25. At any time after the document has been stored to store 30 at step 83, the Originator may terminate his or her user session.

Once an Authorized User receives the notification that the document is available for retrieval from store 30, for example, by receipt of an e-mail message or voice message, the Authorized User logs into the DMS system using a previously known web browser to create a new user session at step 87. The Authorized User may then request retrieval of the document from store 30, at step 88, and any automatic filtering, or filtering selected by the Authorized User, may be performed during the document download process at step 89. The document is then downloaded to the Authorized User at step 90. Each transaction is logged to the appropriate tables of DMS database 25.

In the context of collaborative file sharing, the Authorized User may either "get" a copy of the document, thus leaving the document available for retrieval by other Authorized Users to download and modify, or may "check-out" the document from store 30. If the Authorized User elects to "check-out" the document, only that Authorized User has the right to later "check-in" the document. Whether an Authorized User has rights to "get" or "check-out" a document depends upon the access rights granted by the Originator when the document is first stored in the DMS system. In a preferred embodiment, the Originator retains the rights to later change those access rights. As indicated by return arrow 91 in FIG. 4, after an Authorized User has checked out and modified the document, he or she may check in the modified document to the DMS system, and the modified document is assigned a new version identifier in the document tables of DMS database 25.

In the context of a workflow service provided by DMS system 17, a workflow table may be associated with a document in DMS database that specifies multiple tasks to be performed in sequence by the Authorized Users. In this case, the Originator may associate or import a series of task descriptions stored in DMS database 25 with a document and a list of Authorized Users responsible for performing those tasks. After an Authorized User retrieves the document, performs the task assigned to him or her, and returns the document to store 30, notification server 35 generates and sends an appropriate notification to the Authorized User responsible for the next task in the workflow.

In the context of electronic document delivery, the Originator may specify one or multiple Authorized Users who are permitted access to the document. In this case, notification server 35 generates appropriate messages to the Authorized User(s) via the selected transport mechanism notifying those Users that the document is available in store 30. The Authorized Users may then initiate User Sessions to retrieve the document, including any specified automatic or user selected filtering requested for the document.

In the context of a document distribution service, the document is made available in store 30 to one or more Authorized Users, who may or may not be known to the Originator at the time that the document is placed in store 30. The Authorized Users may initiate User Sessions to retrieve the document, including any specified automatic or user selected filtering requested for the document. This service could be used, for example, to electronically distribute a copyrighted book, by permitting users who pay for the book to access and download the book.

Figure 5:
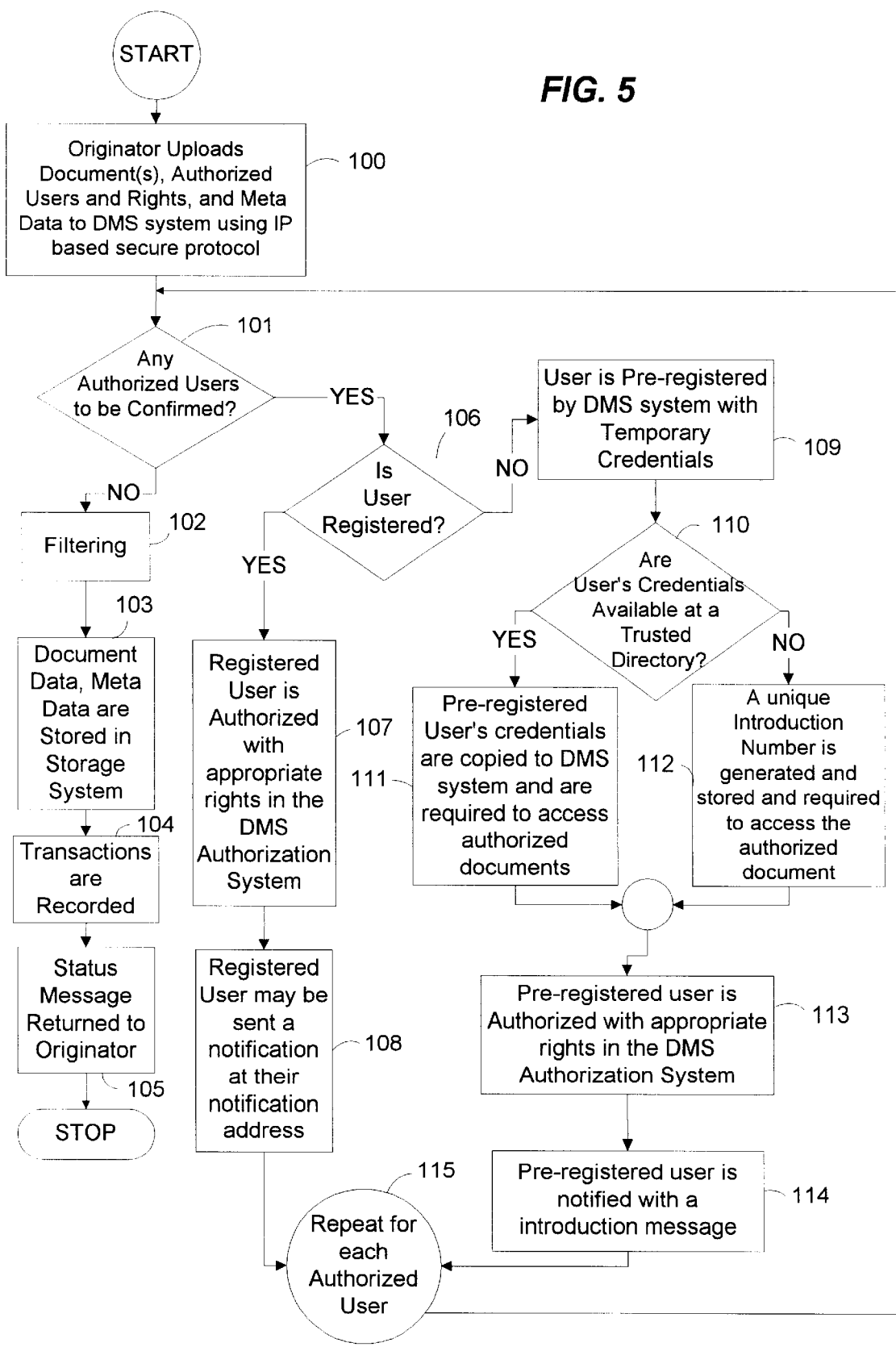
FIG. 5 is a detailed flowchart depicting the process of storing an electronic document in the DMS system of the present invention.

Referring now to FIG. 5, a detailed flowchart for the process of uploading and storing a document in DMS system 17 is described, corresponding to steps 81–86 of FIG. 4. The Originator first logs on and creates a user session as described hereinafter with respect to FIGS. 10 and 11. The Originator now may upload and store one or more electronic documents and information pertaining to the Authorized Users for those documents to DMS system 17, preferably using a secure Internet protocol, such as Secure Socket Layer ("SSL") at step 100.

The Originator may "package" a document prior to uploading to the DMS system, for example, using a compression routine, encryption routine, or by adding a digital signature using applications available on the client computer, e.g., personal computer 10. Alternatively, such "packaging" may be automatically (or selectively, at the Originator's request) performed by DMS system 17 as part of a filtering process during upload and storage of the document at step 102.

Where an encryption filtering function is employed, the document may be encrypted using a symmetric algorithm with a unique session key. As will of course be understood, any symmetric cipher may be used to encrypt the file. The session key may be generated using unique information about the file (e.g., Document Instance ID, User ID, date/time information) and optionally, session specific information provided by the user. In the case where the Originator provides information (e.g., a password or code), an Authorized User attempting to retrieve the file must provide the same information to permit the DMS system to regenerate the session key. Based on the packaging type (if any) of the document and the storage encryption type, the document instance encryption type is set.

At step 101, the Originator may designate the Authorized Users for the document, and the access rights to be granted to those Authorized Users. The Authorized Users may be identified using a public identifier, e.g., UserID, certificate, or notification address. The list of Authorized Users may include users who are not already registered users of a service provided by the DMS system, authorizing those non-registered users with selected rights with respect to the document. For example, an Authorized User only may be allowed to view a document, but not be allowed to edit the document. Additionally, an Authorized User may be granted access to a document only for a limited period of time. The Authorized User's rights also may be implied by the service selected.

Metadata, comprising information about the document itself, also is uploaded and stored in the document tables of DMS database 25 at step 100. Metadata that the Originator may upload into the DMS system includes information on: priority; subject; message; expiration date/time of the document; notification scheduling; confirmation notification; a password protect flag; access control; and filtering request flag. The document and all related data are uploaded and stored to DMS system 17 over secure standard protocols such as SSL/HTTP and SSL/FTP.

At step 101, the system determines whether the Originator has specified any Authorized Users. If none are specified (or all Authorized Users have already been confirmed), the document and metadata are stored in the DMS system at step 103, after any optional automated or requested filtering is performed at step 102. Appropriate transactions are logged to DMS database 25 at step 104 and a status message is returned to the Originator at step 105.

If the Originator specifies an Authorized User (or there are remaining Authorized Users to be confirmed), the system determines at step 106 if the specified Authorized User is registered. If so, then the DMS authorization system, described hereinafter, is updated for that Authorized User to reflect the access rights specified by the Originator or implied by that service at step 107. At step 108, the Authorized User then may be sent a notification by notification server 35 at his or her notification address. The foregoing process is repeated for each Authorized User specified by the originator.

If the Authorized User is not registered with the DMS system, the Authorized User is pre-registered with temporary credentials at step 109. If the pre-registered credentials are determined by the system to be trusted credentials at step 110, for example, if a digital certificate issued by a Certificate Authority (a trusted third-party organization that issues digital certificates) is available, the pre-registered Authorized User's credentials are copied to or referenced by the DMS system at step 111 and are required for the pre-registered Authorized User to access the documents. If the credentials are not trusted credentials, a unique introduction number is generated and stored in DMS database 25 at step 112. The pre-registered Authorized User then must use this introduction number to access the documents.

At step 113, the pre-registered Authorized User is granted the appropriate rights in the DMS authorization system. The first time a pre-registered Authorized User is introduced to a DMS service, an account is created for that Authorized User. Alternatively, if the pre-registered Authorized User already has been introduced to a DMS service by a registered user, the existing pre-registered Authorized User is simply given authorization to access the new document. At step 114, the pre-registered Authorized User is sent an introduction message explaining how to access the documents, and the entire process is repeated for each new Authorized User at step 115.

At steps 107 and 113, Authorized Users are granted rights using the DMS authorization system, which defines the rights users have on particular document objects, document instances and document groups. For example, when DMS system 17 is used for a document delivery service, the following steps occur:

A document group is created to logically contain the documents to be delivered;

A document object and document instance are created for each document;

Document group rights, document instance rights, and document object rights are created for the Originator and Authorized User. For example, with respect to a document uploaded to the DMS system, an Originator may have owner rights, retrieval rights, viewing rights and the right to revoke access by a previously specified Authorized User, while an Authorized User may have viewing and retrieval rights.

Figure 6:
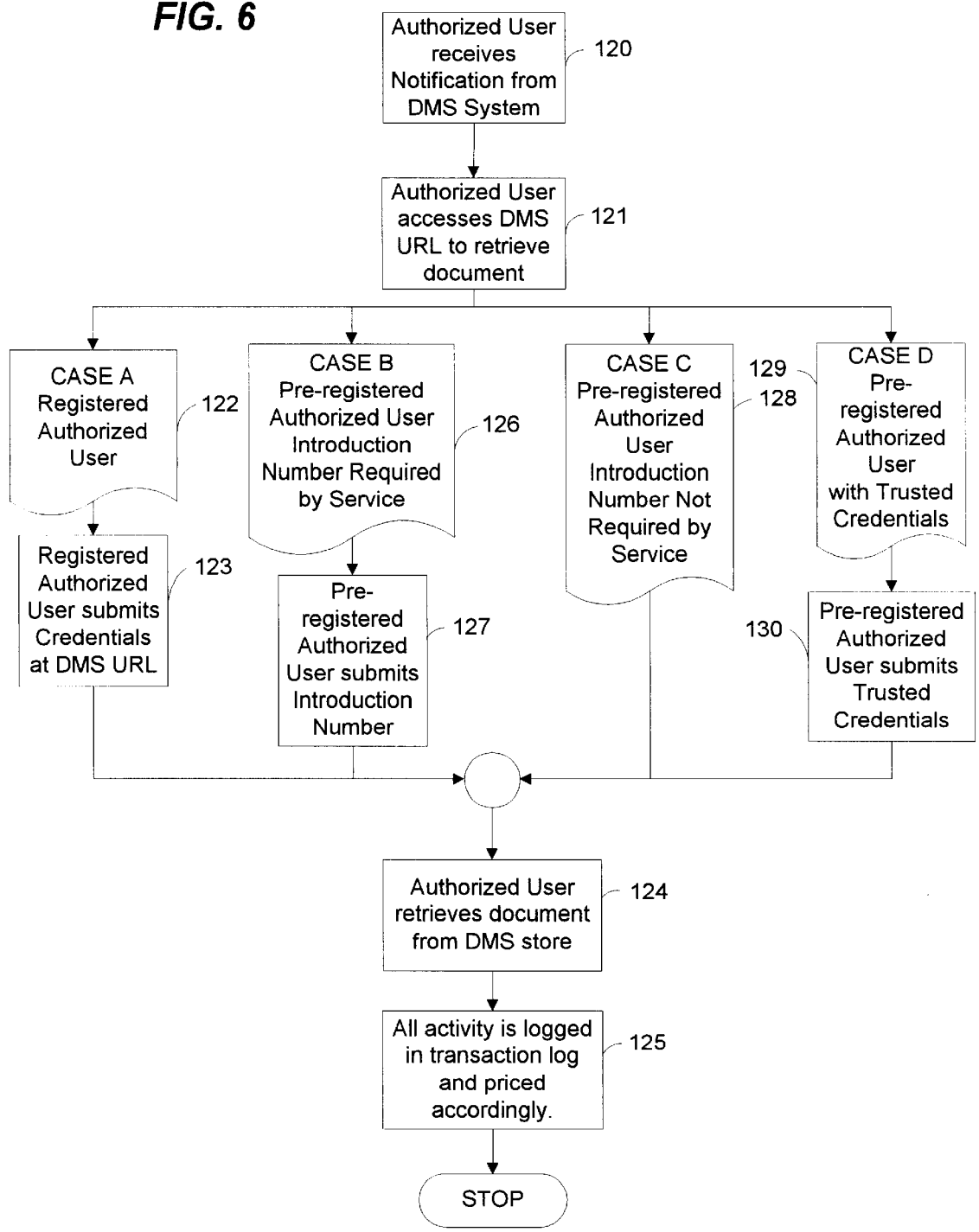
FIG. 6 is a detailed flowchart depicting the process of retrieving a document stored in the DMS system of the present invention.

Referring now to FIG. 6, the process by which an Authorized User retrieves a document from DMS system 17 is described. As described hereinabove for the document storage process, a document may be filtered during the retrieval process, e.g., to uncompress or unencrypt a compressed or encrypted document. The first step in document retrieval, at step 120, is for an Authorized User to receive a notification informing the Authorized User that the document is available on store 30. At step 121, the Authorized User logs on to the DMS system, for example, using the DMS system URL and a previously known web browser to retrieve the document. Alternatively, the Authorized User may access the DMS system using a URL contained in the notification informing the Authorized User that the document is available on store 30. The present invention also provides for the use of access tokens whereby the URL contained in the notification may include an access token which is used to control a user's access to the services of the DMS system. The use of access tokens is discussed hereinbelow with respect to FIG. 13. Once the Authorized User logs on to the DMS system, document retrieval follows one of four possible scenarios.

In case A, at step 122, the Authorized User is identified by the DMS system as a registered user. In this case, the Authorized User submits his credentials at step 123. Once the credentials are authenticated, the user is provided access to the documents and data at step 124.

In case B, at step 126, the Authorized User is identified by the DMS system as a pre-registered Authorized User and the service which he or she is accessing requires an introduction number. In this case, the user is supplied with the introduction number either through a notification message (see step 112 of FIG. 5) or by the Originator using a separate channel of communication. The user then submits the introduction number at step 127. Once the introduction number is authenticated, the user is provided access to the documents and data at step 124.

In case C, at step 128, the Authorized User is a pre-registered Authorized User and the service that he or she is accessing does not require credentials. In this case, the Authorized User may directly access the documents and data at step 124.

In case D, at step 129, the Authorized User is a pre-registered Authorized User with trusted credentials (corresponding to step 111 of FIG. 5). In this case, the pre-registered Authorized User submits the trusted credentials at 130. Once the credentials are authenticated, the user is provided access to the documents and data at step 124.

In all cases, all of the Authorized User's activities are logged in the transaction log at step 125.

Transaction Logging

The DMS system of the present invention preferably supports an extensible set of transaction types. A core set of transaction types is defined by the DMS system and each service provided by the DMS system may define additional transaction types. Transaction types have the following properties:

Name

Billing type: "not billable"; "billable by count"; "billable by value"

Each service account may have a separate pricing plan, and each pricing plan may have an associated price per period (e.g., monthly subscription), as well as a pricing mechanism whereby each transaction type is priced for a given value of that transaction ("transaction type pricing plan"). For example, if the transaction type is document storage, then the transaction type pricing plan may include the following information:

Transaction type (e.g., document storage)

Pricing plan (e.g., monthly)

Price (e.g., $0.50 per unit)

Minimum Value (e.g., 0 KB)

Maximum Value (e.g., 10 KB)

Minimum chargeable price (e.g., $1)

Maximum chargeable price (e.g., $5)

Visibility: Visible or Not visible, identifying whether the user can view logged information on this transaction type.

Given the foregoing information, the value of each transaction may be calculated and logged in the transaction tables of DMS database 25 with an associated price.

Each transaction may be associated to one or more of: document; document instance; document group; or a notification (i.e., a particular notification message generated by the DMS system). Each transaction also may be associated with at least one of: a user account or a service account, and preferably is timestamped with the date/time of the transaction. Additionally, each transaction may be digitally signed by the DMS system. Transactions also may be nestable, i.e., each transaction may have a parent transaction associated with it. Transactions may be used to form an audit trail for a given user, account, document, document instance, document group, or notification. Every one of these objects preferably has at least one logged transaction linked to it.

For example, for a New Document transaction in the context of a document delivery service, the following data may be stored in the transaction information tables of DMS database 25:

Parent transaction=document delivery
    Transaction type=new document
    Notification ID=null
    Document Instance ID=9812731
    Document Group ID=null
    Document ID=2832837
    Account ID=5632219
    User ID=3878772
    Amount (Value)=1
    Price (Currency)=$0.50
    Date/Time=12:34:43.99 EST Mar. 01, 1999
    Visible=yes
    Status=active The transaction links the new document to a document ID (for the document object) and a document instance ID (for the specific instance or version of this document and its related details including a pointer to its storage), the account ID, and the user ID of the user who did the transaction.

The transaction log may be used to generate a billing statement for each account user. A billing statement can be generated for a particular account and particular statement period. In addition, the DMS system of the present invention also allows for user-defined identifiers (billing codes) to track and organize user activity. For example, a lawyer storing a contract on DMS system 17 may include as part of the metadata for the document an identification of the client's billing code.

During the process of generating a billing statement, the status of each of the transactions included in the billing statement are changed from "active" to "archived." Transactions marked as "archived" then may be removed from the transaction log (for improved search performance of the main transaction log) and placed into another log (e.g., an archived transactions log). Alternatively, transactions marked as archived can be automatically set to "delete" after a predetermined configurable lifetime. This status change from "archived" to "delete" may occur in both the transaction log and the archived transaction log. Transactions set to "delete" are automatically deleted after a timeout period.

Figure 7:
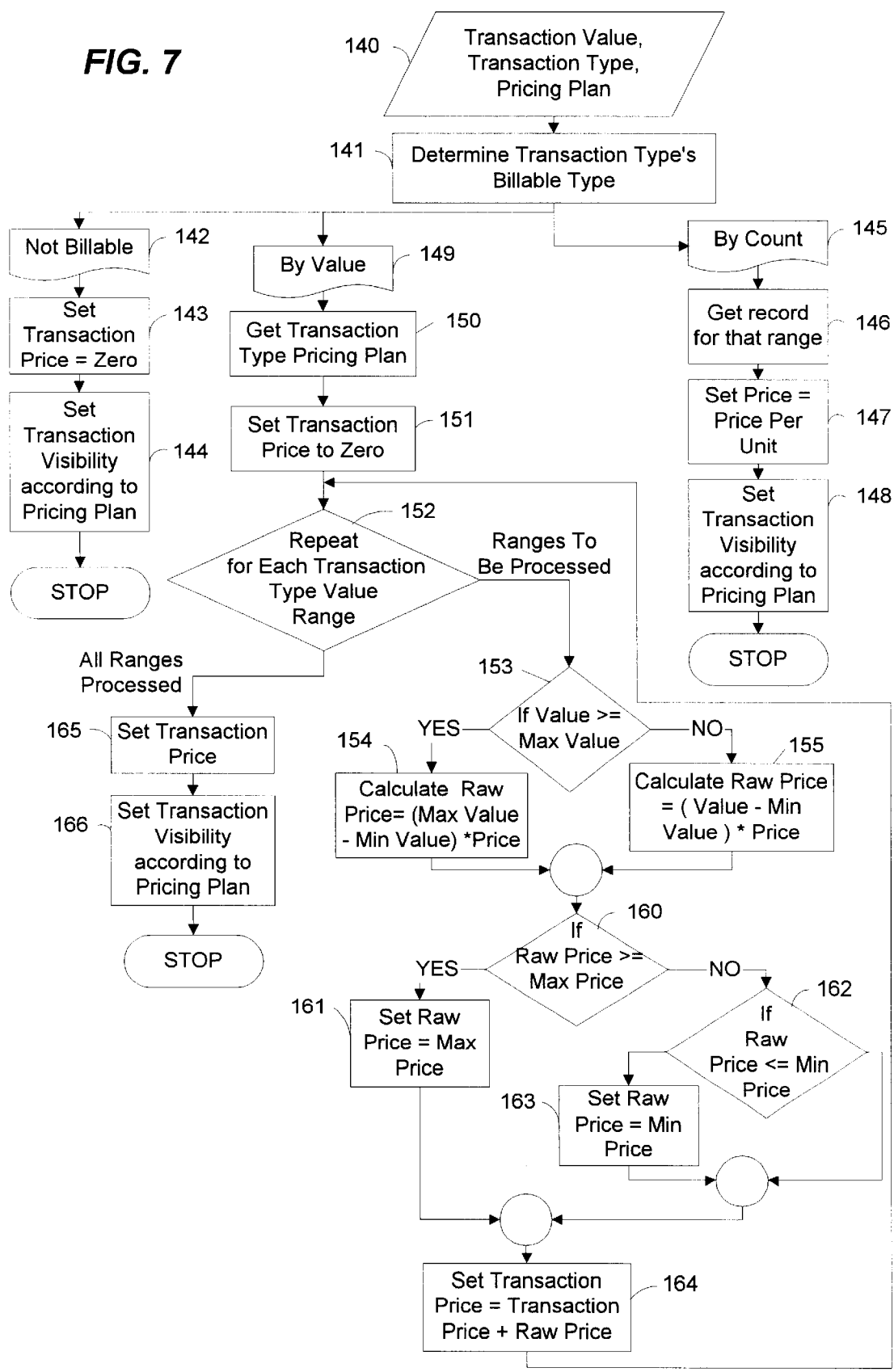
FIG. 7 is a flowchart depicting the process of logging a storage transaction.

Referring now to FIG. 7, the process of logging a storage transaction on the DMS system of the present invention is described. As explained above, the DMS system offers many different services, each of which may have transactions that are logged and billed. FIG. 7 is a representative example of the process of logging one such transaction.

At step 140, the logging process requires as input: the transaction value (amount), transaction type, and pricing plan. At step 141, the DMS system determines a billing type associated with the transaction type. If the transaction is "not billable," determined at step 142, the transaction price is set to zero at step 143, and transaction visibility is set according to the pricing plan at step 144. If the transaction type's billing type is "by count," determined at step 145, then the record for that range is retrieved from DMS database 25 at step 146. The transaction price is set at step 147 and visibility is set according to the pricing plan at step 148.

If the billable type is "by value", determined at step 149, then the transaction type pricing plan is retrieved from DMS database 25 at step 150. In an example in which the transaction consists of storing a 1.5 MB document to the DMS system, the transaction type is "document storage" and the value is 1.5 MB. This transaction type is billable "by value" and there are two priceable value ranges: 0–1 MB and >1 MB. The transaction type pricing plan for the first range would include the following information:

Plan name (e.g. "Gold plan")
    Storage by size
    Price=$0.50
    Minimum Value=0 MB
    Maximum Value=1 MB
    Minimum Chargeable Price=$0.15
    Maximum Chargeable Price=Null
    Visibility=visible The transaction type pricing plan for the second range would include the following information:

Plan name (e.g. "Gold plan")
    Storage by size
    Price=$0.25
    Minimum Value=1 MB
    Maximum Value=Null
    Minimum Chargeable Price=Null
    Maximum Chargeable Price=Null
    Visibility=visible At step 151, the DMS system begins calculating the transaction price by setting the initial transaction price to zero. For each value range within the transaction type's value, determined at step 152, the following process is repeated: At step 153, it is determined if value>=maximum value. If so, the raw price is calculated as (maximum value−minimum value)×price at step 154. If not, raw price is calculated as (value−minimum value)×price at step 155. If raw price>=maximum chargeable price, determined at step 160, raw price is set to maximum chargeable price at step 161. If raw price<maximum chargeable price and if raw price<=minimum chargeable price then raw price is set to minimum chargeable price at step 163. The transaction price is set to transaction price+raw price at step 164. Therefore, continuing with the example, for a 1.5 MB file, the final transaction price would be $0.50 (1 MB×$0.50)+$0.125 (0.5 MB×$0.25)=$0.625.

After the process is repeated for each value range, the transaction price is set at step 165. Transaction visibility is set according to the pricing plan at step 166, and all of the information is logged into the transaction log, completing the logging process.

Service And Service Provider Architecture

Figure 8:
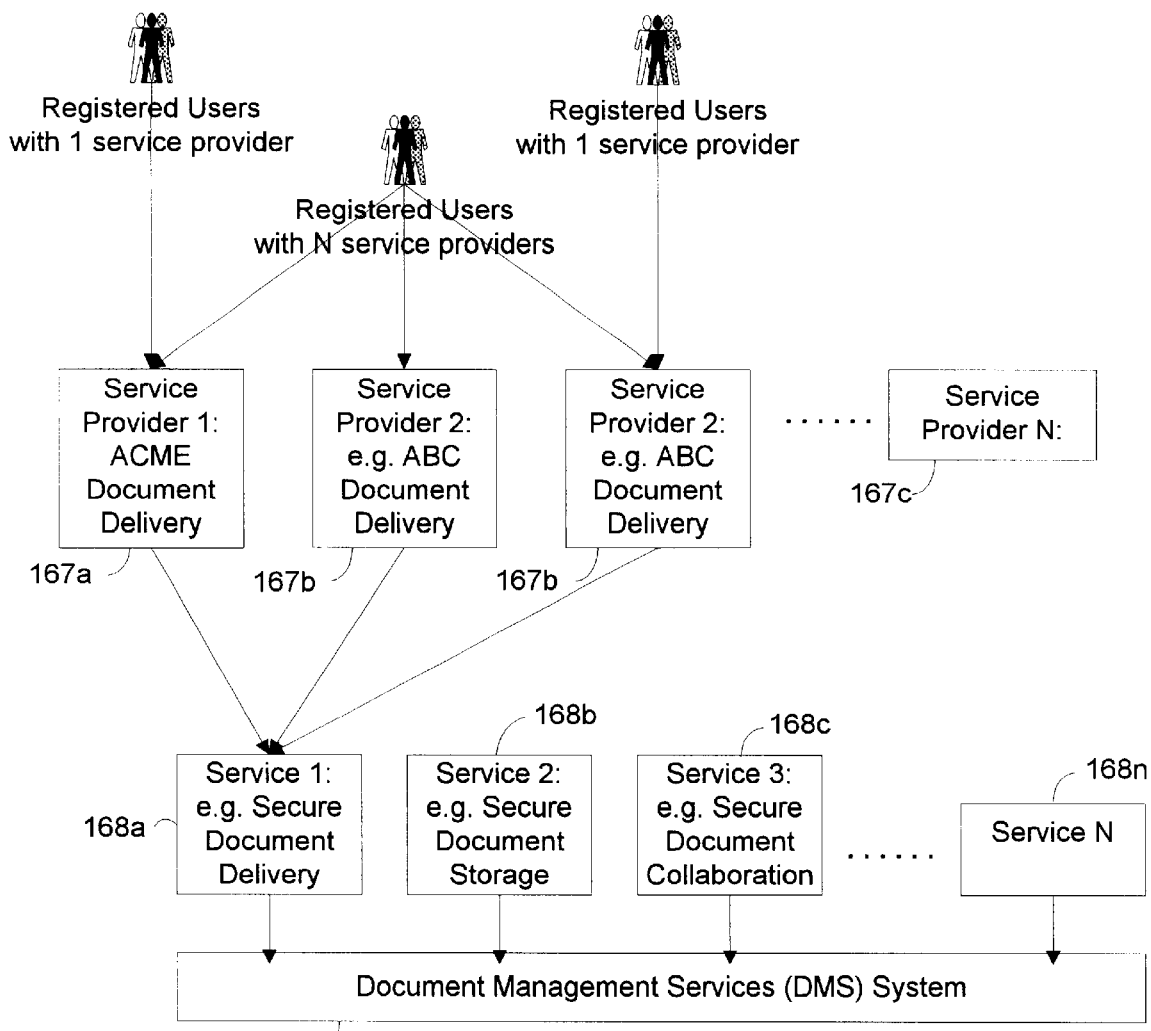
FIG. 8 is a diagram of the service and service provider architecture.

Referring to FIG. 8, an illustrative service and service provider architecture for DMS system 17 of the present invention is described. In the context of this disclosure, a "service provider" is an entity that resells document management services available on a DMS system constructed in accordance with the principles of the present invention, and need not be an ISP.

DMS system 17 provides and supports a number of different services, as described hereinabove. Each service provides a unique interface to the DMS system and a unique way of interacting with the DMS system. Illustrative examples of DMS system services include secure document delivery 168*a*, secure document storage 168*b*, secure collaborative file sharing 168*c*, etc. Each service has a unique interface that limits how a user may interact with the DMS system. For example, a user of a storage service cannot cause DMS system 17 to send a notification to another user, whereas such functionality may be automatically included in a delivery service.

The services interfaces also permit users to interact with DMS system 17 using client applications specific to the service to be performed. For example, a web browser may be used to make requests to DMS system 17 using HTTP over Secure Sockets Layers (SSL) protocol, and a response may be returned in Hyper Text Markup Language ("HTML"). A word processor application may make a request to DMS system 17 using HTTP over SSL and a response may be returned in Extensible Markup Language ("XML"). Each DMS service may respond to requests for data using different formats, e.g., HTML, XML, etc. A DMS service also may respond to requests by structuring the data differently according to a service provider's preferences.

Service providers 167a–167c in FIG. 8 each provide a DMS service using DMS system 17. In accordance with one aspect of the present invention, DMS system 17 may include customization functions, that permit different service providers to access a single DMS system, but create the appearance of separate dedicated server computers. For example, by accessing a document delivery service with a service account provided by ACME Document Delivery, the user will view ACME's corporate logo in the data returned. This may be accomplished, for example, using a "logo" parameter, stored in account information tables 64 (see FIG. 2), which identifies a particular service provider's corporate information to be displayed to a user account administered by that service provider. There may be one or many service providers 167a–c for each of one or more services on a single DMS system.

DMS system 17 thus may host services for many different organizations. Users that have a registered service account may use DMS system 17 to access any service for which they are registered. Moreover, a registered user may have more than one DMS service account, enabling that user to use the same service from more than one service provider 167a–c or use different services from different service providers 167a–c, or any combination thereof. Because a service account contains both a service and a service provider 167a–c, billable activity may be tracked by service and by service provider, thus enabling multiple organizations to appear to the end-users (i.e., registered users) to have a "dedicated" virtual DMS service on the same DMS system 17.

User Registration and DMS Access

The user registration and authentication processes for registering as a user of DMS system 17 are now described. As described hereinabove, many of the services offered by the DMS system of the present invention require a user to have a user account, and information on each user account is stored in the account information tables of DMS database 25. In a preferred embodiment, a user may obtain a user account either by: 1) registration and authentication or 2) through introduction by another registered user.

Each user account is unique to a service account and user; information on each service account also is stored in DMS database 25. A service account comprises a service, a service provider, a pricing plan for every transaction the user does with an account, a limit plan that limits the use of an account (e.g., a limit on the maximum file size that can be uploaded into the DMS system), a feature plan for customizing the features available for each service (e.g., disabling the scheduled delivery feature of the document delivery service), and billing information (billing address and payment information).

Figure 9:
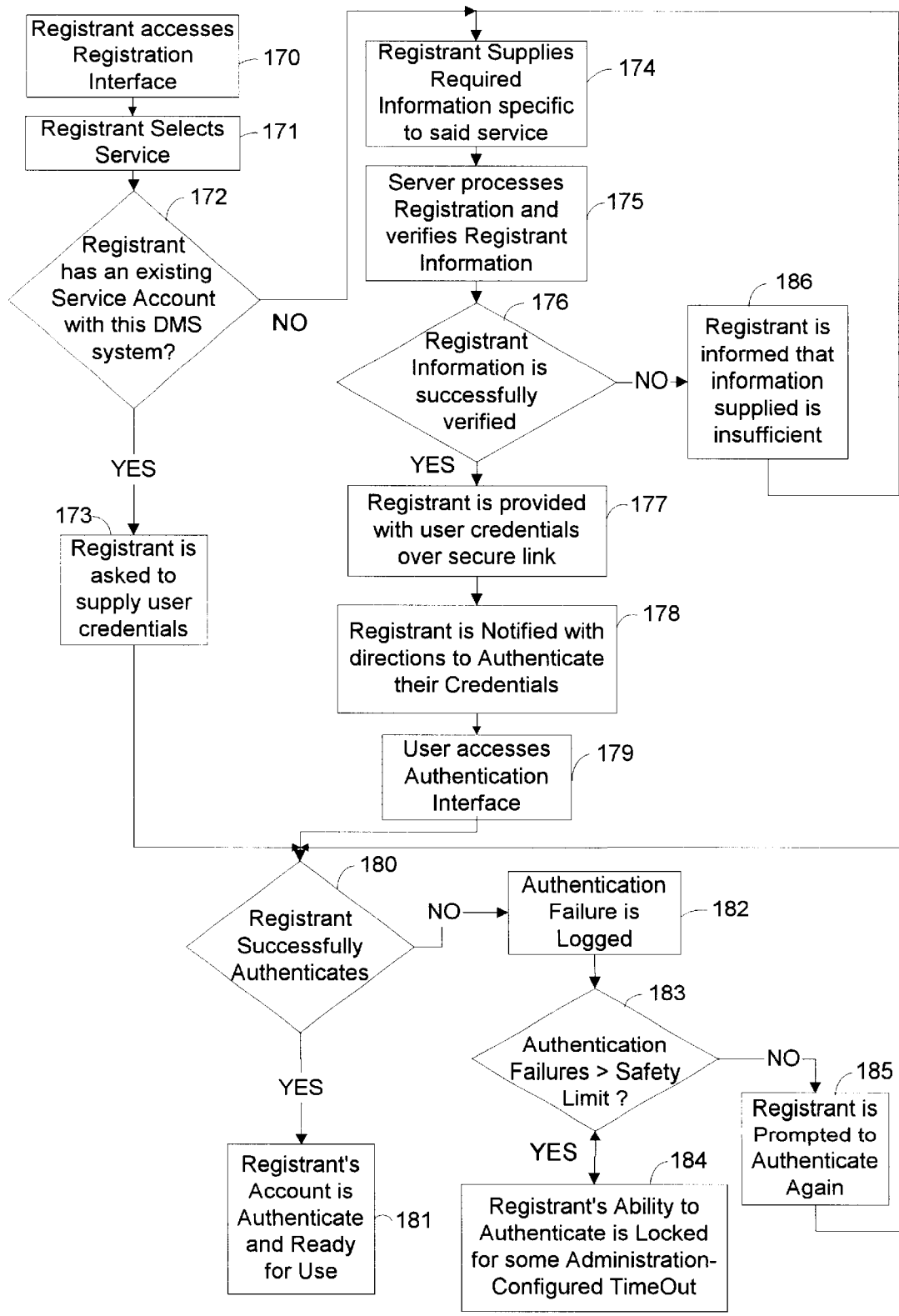
FIG. 9 is a flowchart depicting registration and authentication processes.

Referring to FIG. 9 the registration and authentication processes used by a user to gain access to DMS system 17 are described. At step 170, the registrant accesses the DMS system registration interface, for example, using a web browser to access the DMS system's registration interface URL. Next, at step 171, the registrant selects a DMS service for which he or she wishes to be registered. At step 172, the DMS determines whether the registrant already has an existing DMS service account.

If the registrant already has a DMS account, registration for a new service requires that the registrant provide his or her user credentials at step 173 and then authenticate those credentials at step 180. If the registrant has no pre-existing account, determined at step 172, the registrant is requested to provide personal information, such as name, address, notification address (e.g., e-mail address, telephone number, IP address), payment information, etc. at step 174. At step 175, the DMS server computer processes and verifies the registration information. If the information is not successfully verified at step 176, the registrant is informed that insufficient information has been provided, at step 186, and the registrant is requested to resubmit the information.

If the information is successfully verified, the registrant is provided with user credentials over a secure link at step 177. User credentials, which may consist, for example, of alphanumeric user IDs, alphanumeric passwords, digital certificates, and/or notification addresses, permit the user to securely access documents, upload documents, view authorized information on documents, digitally sign documents, etc. A user's credentials uniquely identify the user to the DMS system. At step 178, the registrant is given instructions to authenticate his or her credentials.

Once the registrant is issued credentials, or is determined to already have credentials, the authentication process begins, at step 179. This may be accomplished by the registrant accessing the DMS authentication interface by inputting the URL associated with the DMS authentication interface into his or her web browser. Once the registrant is successfully authenticated, at step 180, the registrant's new service account is ready for use at step 181. If the registrant is not successfully authenticated at step 180, an authentication failure is logged at step 182. If the number of authentication failures exceeds a predetermined number, at step 183, the registrant's ability to authenticate is locked for a predetermined period of time at step 184. If the number of authentication failures does not exceed the predetermined safety limit, the registrant is prompted to authenticate again at step 185.

Figure 10:
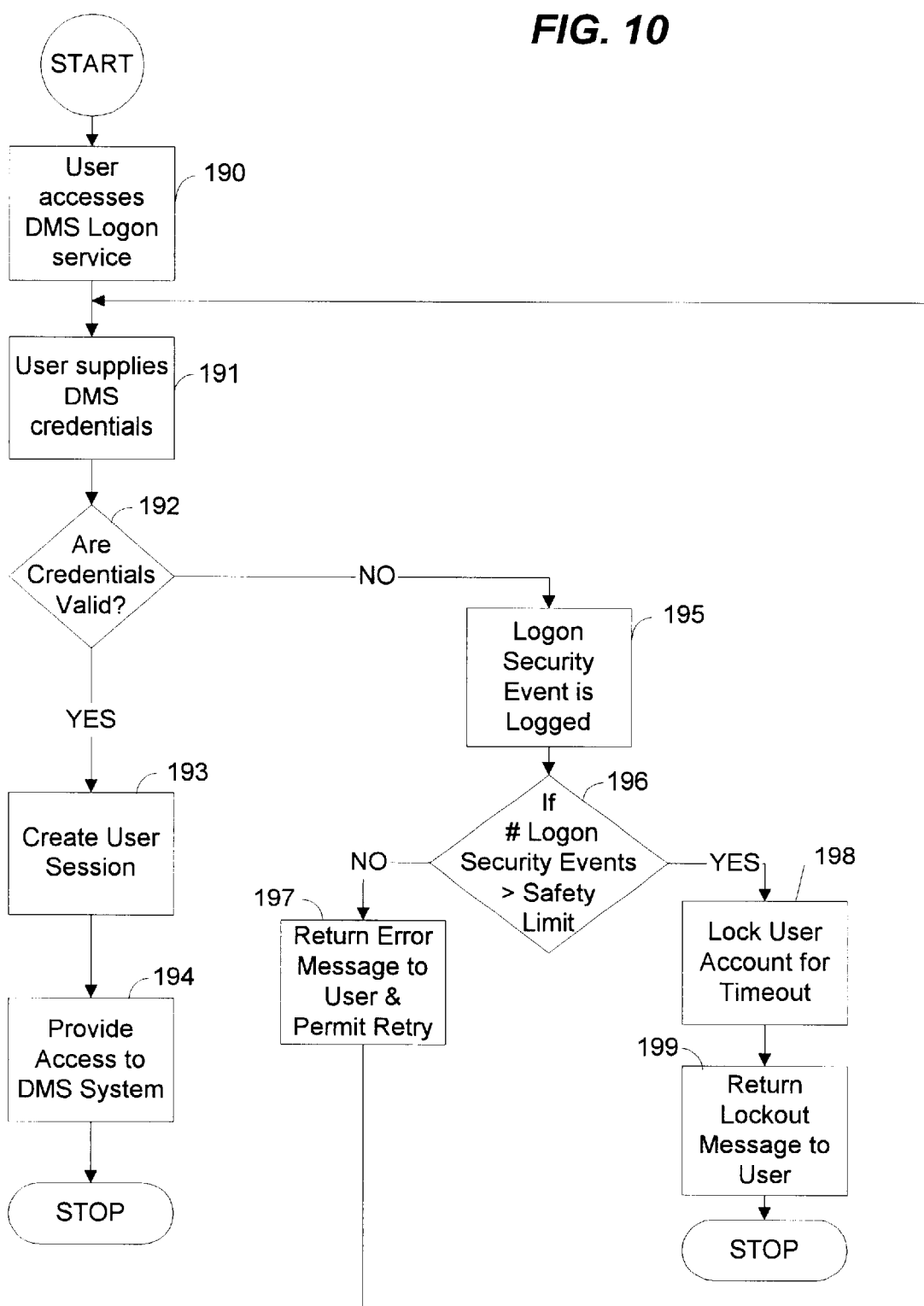
FIG. 10 is a flowchart depicting the logon process.
Figure 11:
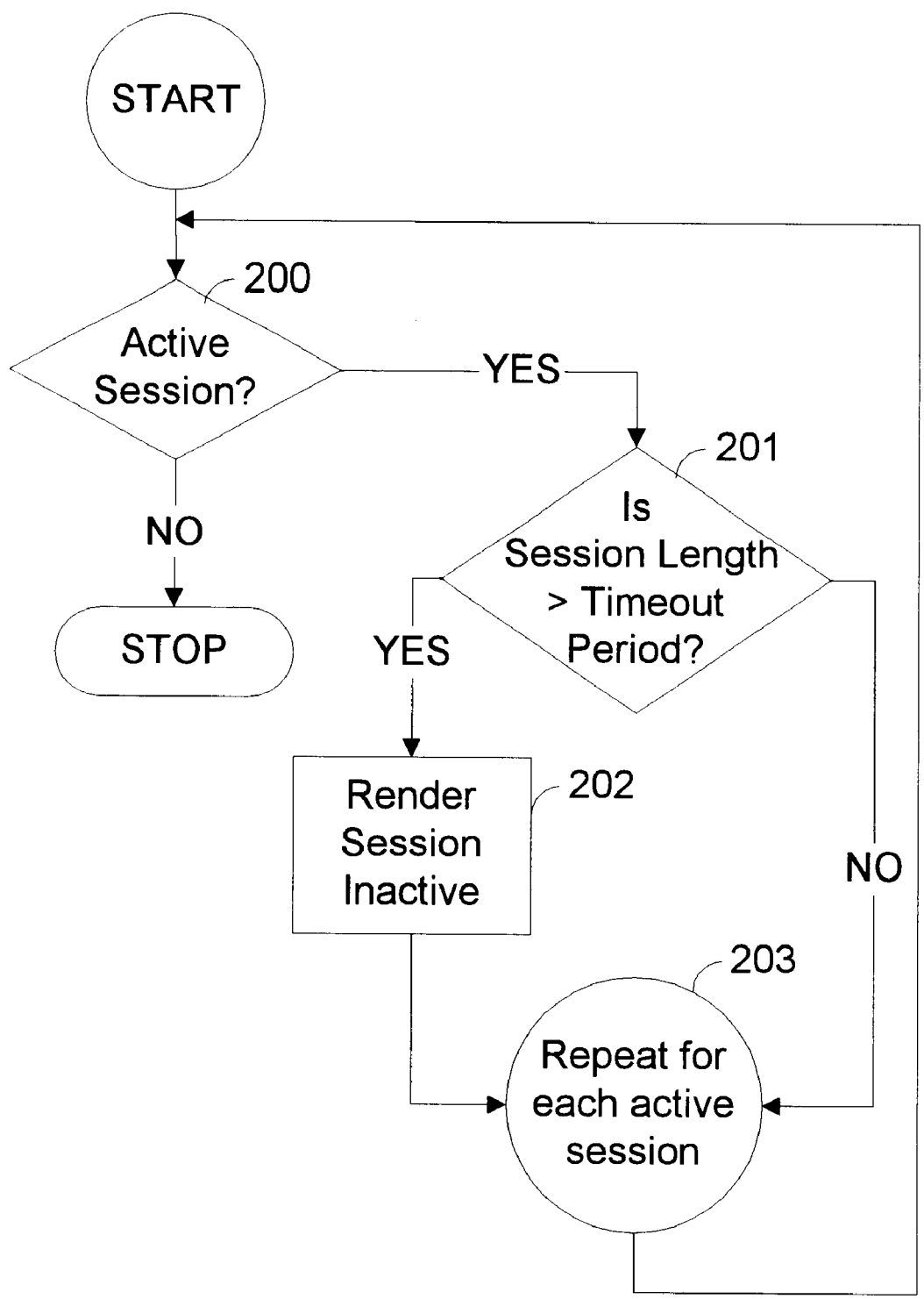
FIG. 11 is a flowchart depicting a session management process.

Referring now to FIG. 10, after a user has become registered and has authenticated his or her credentials with the DMS system, the user then may access the services provided by the DMS service by logging on to the DMS system. A user first accesses the DMS logon service at step 190, for example, using a web browser to access the URL associated with the DMS logon service. The user then supplies his or her credentials at step 191, and the DMS checks to see if the credentials are valid at step 192. If the credentials are valid, a user session is created at step 193 and the user is given access to the DMS system at step 194.

If the credentials are not valid, a logon security event (noting that there has been a failed logon attempt) is logged at step 195. The DMS checks to see if the number of logon security events exceeds a predetermined number at step 196. If that number is not exceeded, an error message is sent to the user and the user is permitted to retry the logon process at step 197. If the number of logon security events exceeds the predetermined number, the user is locked out of the system at step 198 and a message to that effect is sent to the user at step 199. If the user makes a request to the DMS system after the current session has expired, he or she will be asked to logon again.

Once a user has successfully logged on, a user session is logged and stored in DMS database 25. A session comprises a unique alphanumeric identifier and a timestamp, and is associated with a specific user account. Each request made to the DMS after logging in as a registered user must include the correct session password or service will be denied and a security event will be logged. Successive security events cause an account lockout, preventing the user from gaining further access to the DMS system.

HTTP sessions are stateless, so information on these sessions must be maintained in database 25. Communications to server 20 contains a session identifier number that references session information in database 25. Sessions are managed by an automatic process, illustrated in FIG. 11, that continually monitors the length of a session to determine if a current session is longer than a specific, predetermined interval. If there is an active session, determined at step 200, the DMS system determines if the session length is greater than the predetermined interval, at step 201. If the interval has been exceeded, the user session is rendered inactive at step 202 and a flag to that effect is entered in the corresponding database entry. The process is repeated at step 203 for each active session. Alternatively, a user forced logout/exit also may render a user session inactive and the corresponding database entry is flagged accordingly.

Notification Processes

Figure 12A:
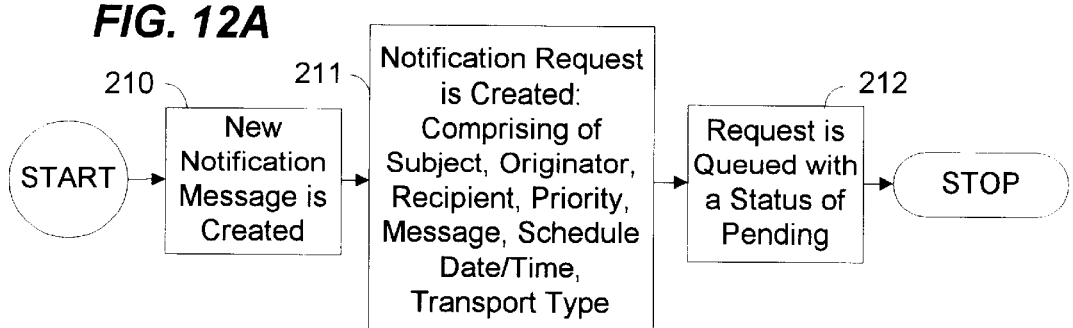
FIGS. 12A and 12B are flowcharts depicting the notification request and delivery processes.
Figure 12B:
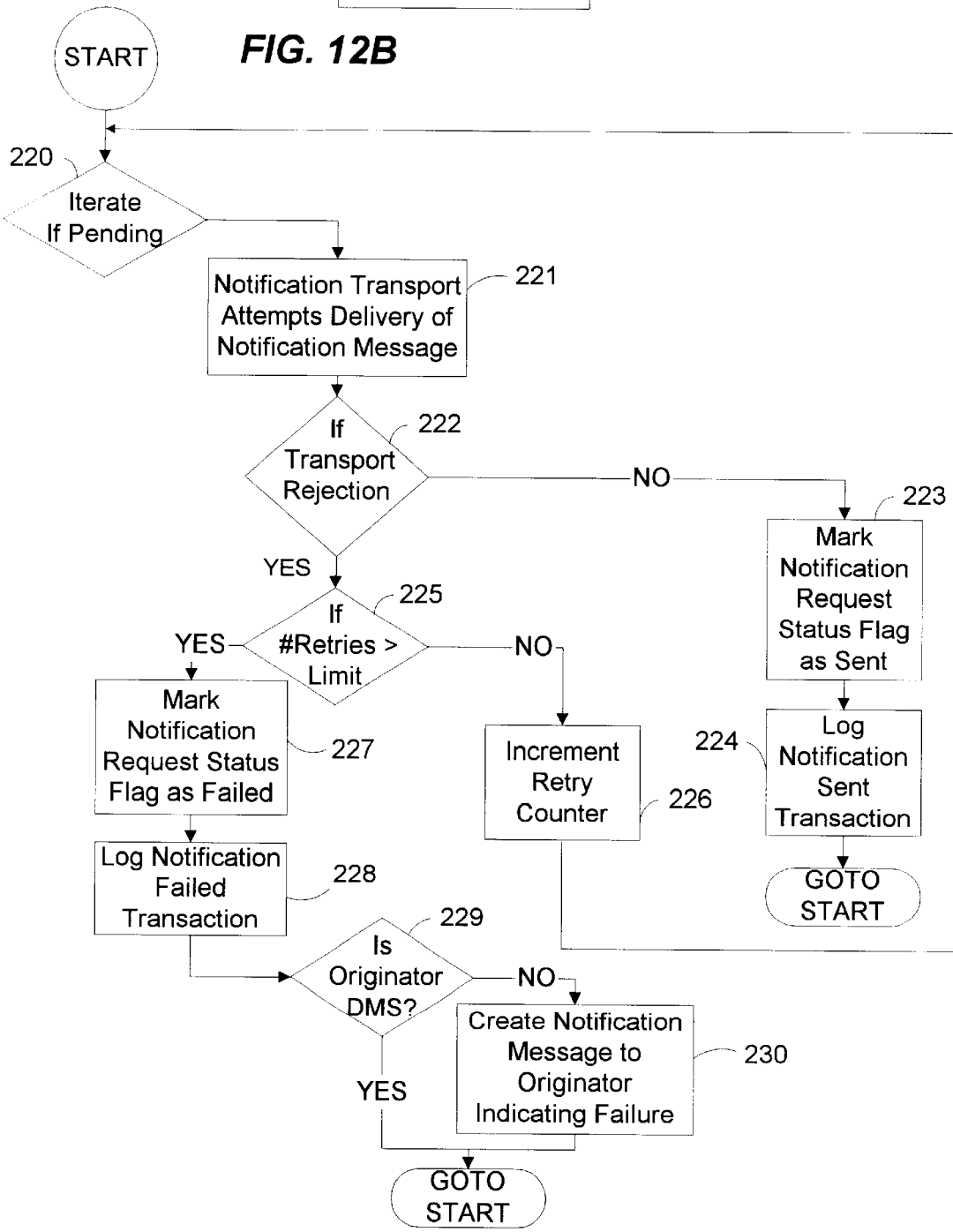

Referring now to FIGS. 12A and 12B, the notification request and confirmation services available on a preferred embodiment of DMS system 17 are described. Notification messages are generated by notification server 35 in response to various user events. For example, when a registrant registers for a DMS service, the registrant receives a notification with instructions on authorization, as discussed hereinabove with respect to step 178 of FIG. 9.

As another example, when an Originator has created an electronic document and uploaded that document to the DMS system, Authorized Users having access to the document may receive a notification that the document is available to be retrieved (as discussed with reference to steps 108 and 114 of FIG. 5). In this case, the notification may contain instructions on how the document may be retrieved from the DMS system. The notification messages are digital and may take the form of an alphanumeric message, digital sound, digital image or other digital forms. DMS system 17 therefore preferably supports several types of notification transports including e-mail, fax, voice messaging and pager.

With respect to FIG. 12A, the notification request process performed by DMS system 17 is described. At step 210, a notification message is created by notification server 35 responsive to some user-initiated event. At step 211, a notification request is created that contains some or all of the following information: (1) the subject of the message; (2) the Originator's notification address (e.g., an e-mail address); (3) the notification address of the Authorized User(s); (4) the priority of the notification (e.g., high, medium, or low); (5) the body of the message, including a unique notification identifier created by the DMS system; (6) optionally, an indication of the date and time that the message should be delivered; (7) a status flag (e.g., "pending", "sent", or "failed") indicating the status of the notification delivery, initially set to "pending"; (8) the transport type for the notification (e.g., e-mail, voice message, etc.); and (9) a retry counter that tracks the number of times that a notification request has been processed (initially set to zero, and incremented upon each unsuccessful delivery attempt until the notification request status is marked "failed.") The notification request is queued, at step 212, with a status of "pending," in notification information tables 66 of DMS database 25.

The notification delivery process is described with respect to FIG. 12B. At step 220, the system iterates through the records in the tables with a "pending" flag. At step 221, notification server 35 attempts to deliver the notification using the specified transport system for that Authorized User. DMS system 17 then checks to see if there is a transport rejection, at step 222, for example, if notification server 35 is not working. If no transport rejection is detected, the notification request flag is set to "sent" at step 223, and the notification transaction is logged as sent at step 224.

If a transport rejection is detected, at step 222, a retry counter is checked at step 225. If the number of retries does not exceed a predetermined limit, the retry counter is incremented at step 226 and the notification process begins again. If the number of retries exceeds the predetermined limit, the notification request flag is set to "failed" at step 227, and the notification transaction is logged as "failed," at step 228. At step 229, the DMS system checks information on the origin of the notification request, where the origin of a notification request may be either the DMS system or a system user.

For example, as described hereinabove, when the notification comprises directions for authorization of a new registrant, the notification is automatically generated by the DMS system. However, if the notification is a notification that a document has been stored in store 30 for subsequent retrieval by Authorized Users, the notification may be initiated at the request of the originator who uploaded the document to store 30. At step 229, if the system determines that the origin is a system user (rather than the DMS system), a new notification message reporting the failed notification delivery attempt is generated and sent to the system user at step 230.

It is possible for a notification to be sent, but for the send to be unsuccessful, for example, if the notification recipient's e-mail address is incorrect. For this reason, each notification transport that delivers notification messages also preferably receives messages that notifications have been sent successfully but have failed during transport. Each notification transport is polled by an automated process for any new messages. Upon receiving a failed notification, this process determines (if possible) the notification identifier, marks the original notification request as "failed" and logs a failed notification transaction linked to the original notification request. In addition, if the origin is not the DMS system, a notification is generated and sent to the sender indicating a failed delivery.

Access Tokens

Figure 13:
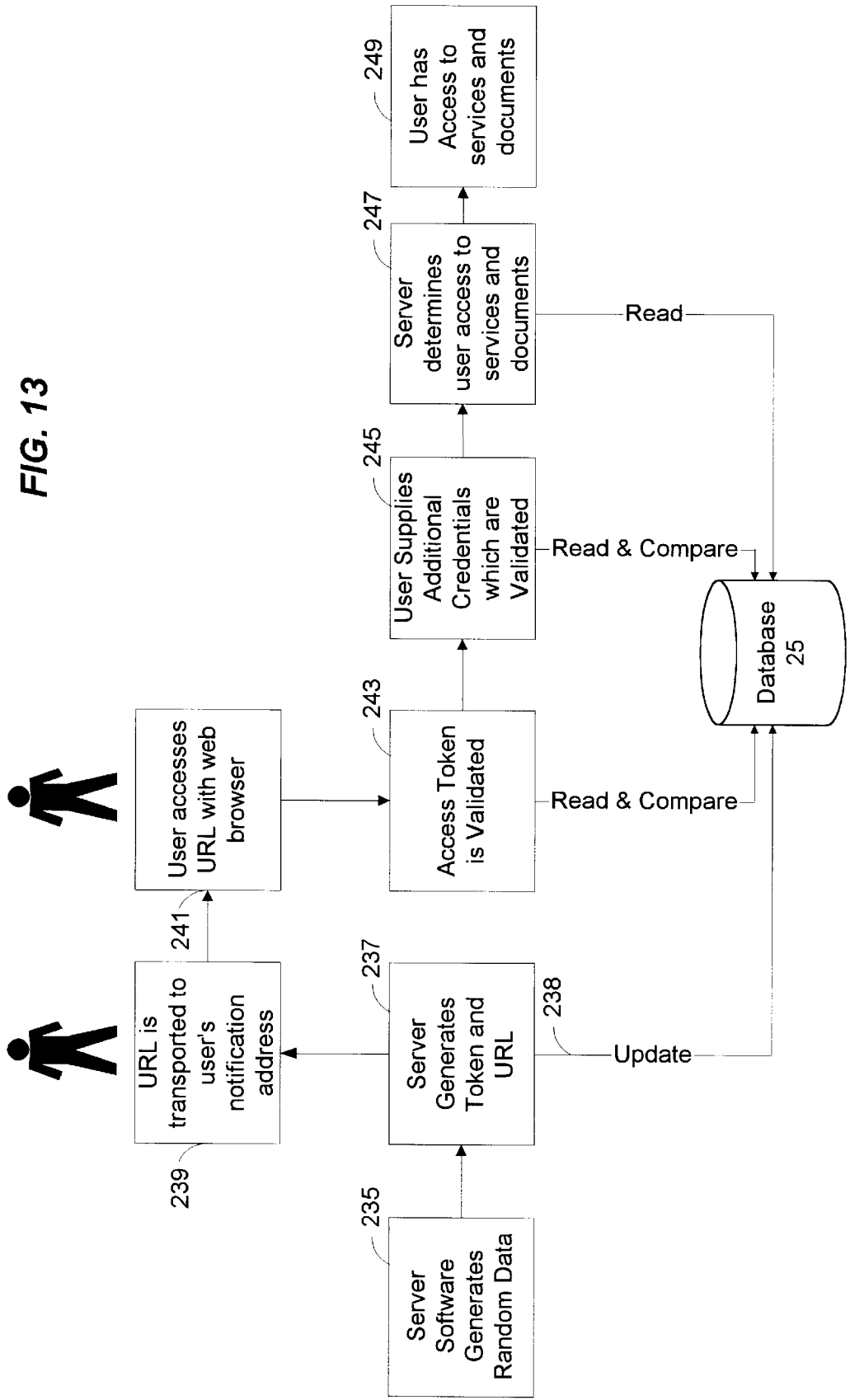
FIG. 13 is a diagram depicting the process by which access tokens are created and used to control a user's access to the services of the DMS system.

Referring now to FIG. 13, the process by which access tokens are created and used to control a user's access to the services of the DMS system is described. The present invention uses access tokens as an added security feature to ensure that only validated users access the services of, and documents stored in, the DMS system. As heretofore stated, an access token of the present invention is comprised of a signed string unique to a transaction and generated from one or more random numbers independent of any user information or resource information or any other identifiable information. The following description describes one method by which access tokens of the present invention can be generated.

At step 235, server computer 20 generates two random strings of alphanumeric data, T and K.

At step 237, server computer 20 generates an access token by: (1) concatenating an expiry timestamp for the access token (or a timestamp token from a timestamping authority) (TST) to T resulting in T+TST; (2) hashing K using a well-known hashing algorithm such as MD5 (described in RFC (Request for Comments) 1321) resulting in H(K); (3) using a known symmetric encryption algorithm to encrypt T+TST with H(K) resulting in a message authentication code (MAC); and (4) concatenating T+TST+MAC, where T, TST and MAC are all of known lengths. Server computer 20 then uses the access token to generate a URL:

protocol+issuer+service identifier+access token, where protocol is a TCP/IP-based protocol for transferring data (e.g., http); issuer is the issuer of the access token (which may be the DMS system or some third party); and service identifier identifies the service to which the user is given access, e.g., document delivery.

At step 238, after the URL is generated, security information tables 68 in database 25 are updated to include a record for the newly created access token, i.e., the record should include the user ID (of the user that the access token was generated for); T; K; the generation time of the access token; the expiry time of the access token; and any specific information regarding the access token, e.g., the reason why the access token was generated.

At step 239, a notification containing the URL is sent to the user's notification address. At step 241, the user accesses the URL with a Web browser.

At step 243, server computer 20 checks the validity of the access token from the URL. Since T, TST and MAC are of known lengths, server computer 20 is able to parse the access token into T' (the portion of the URL that should match T); TST' (the portion of the URL that should match TST); and MAC' (the portion of the URL that should match MAC). Security information tables 68 are examined using T' as the primary key. If there is no database record in security information tables 68, the user's request is invalid and the user is not given access to any services offered by the DMS system. If there is a database record, the expiry time of the access token is examined—if the access token is expired then the user is denied access to the DMS system. If the access token is not expired, then TST' is compared to the expiry time of the access token (stored in the database record)—if these do not match then the access token has been tampered with and the user is denied access to services. If there is a match, the next step is to validate MAC' with the information from the database record, i.e., hash K to obtain H(K) and then use H(K) to encrypt T+TST to obtain MAC. Once MAC' has been validated, the access token is validated.

If the access token was not validated, a security event is logged in security information tables 68 (using T as the primary key). If more than three security events have been logged for this access token, the record corresponding to this access token is deleted, a new access token is generated and a notification with the new URL (with the new access token) is sent to the user with a security message regarding the old access token.

After the access token has been validated, optional step 245 may be undertaken which requires user to provide additional credentials, e.g., a certificate. At this step, any additional credentials are verified by examining security information tables 68 of database 25.

At step 247, server computer 20 determines the user's access rights with respect to the services provided by the DMS system and documents stored in the DMS system by examining security information tables 68, document information tables 61 and user information tables 62 of database 25. At step 249, the user is granted appropriate access rights to the requested DMS system services and to documents stored in the DMS system.

One skilled in the art will appreciate that the present invention can be practiced by other than the described embodiments, which are presented for purposes of illustration and not of limitation, and the present invention is limited only by the claims that follow.

What is claimed is:

1. An Internet-based document management system comprising:
    an Internet-based store for storing an electronic document;
    a database including a document table for storing information about the electronic document; a user table for storing information about users of the Internet-based document management system; a security information table for storing information about access tokens; and a transaction table that stores information about transactions performed on the electronic document;
    a server connected to the Internet-based store and the database, the server programmed to receive the document from a remote computer using an Internet protocol and store the document in the Internet-based store, the server programmed to provide a plurality of services supported by the database and to generate and validate access tokens; and
    a notification server connected to the server, the notification server generating and dispatching notifications comprising the access tokens.

2. The Internet-based document management system of claim 1 wherein the access token comprises a timestamp.

3. The Internet-based document management system of claim 1 wherein the access tokens are used to control a user's access to the plurality of services.

4. The Internet-based document management system of claim 1 wherein the access tokens are used to control a user's access to the electronic document.

5. The Internet-based document management system of claim 1 wherein the plurality of services comprises at least a document storage and retrieval service and an electronic document delivery service.

6. The Internet-based document management system of claim 5 wherein the plurality of services further comprises a collaborative file sharing service.

7. The Internet-based document management system of claim 1 wherein the server is programmed to filter the electronic document before storing the document in the Internet-based store.

8. The Internet-based document management system of claim 7 wherein the filter provides one or more of: compression, decompression, encryption, decryption, translation, and formatting.

9. The Internet-based document management system of claim 5 wherein the document management system provides a customization function wherein a user is presented with corporate information corresponding to one of a plurality of service providers employing the document management system.

10. The Internet-based document management system of claim 1 wherein the database further comprises an account information table including accounting data, and the server is programmed to apply the accounting data to the information stored in the transaction table to determine a price reflecting usage of the document management system.

11. A method of providing Internet-based document management comprising:

providing an Internet-based store, a database, a server connected to the Internet-based store and the database, and a notification server connected to the server;

accepting a connection from a first remote computer to the server using an Internet protocol;

receiving an uploaded electronic document from the first remote computer to the server using an Internet protocol;

generating a record in a document table of the database to store information about the electronic document;

generating a record in a user table of the database to store information about users of the electronic document;

generating a record in a transaction table of the database to store information about transactions performed on the electronic document;

generating an access token;

generating a record in a security information table of the database to store information about the access token;

storing the electronic document in the Internet-based store;

accepting a connection from a second remote computer to the server using an Internet protocol;

providing to the second remote computer a plurality of document management services supported by the database; and providing to the second remote computer a notification comprising the access token.

12. The method of claim 11 wherein the access token comprises a timestamp.

13. The method of claim 11 wherein the access token is used to limit a user's access to the plurality of document management services.

14. The method of claim 11 wherein the access token is used to limit a user's access to the electronic document.

15. The method of claim 11 wherein providing to the second remote computer a plurality of document management services supported by the database comprises providing at least a document storage and retrieval service and an electronic document delivery service.

16. The method of claim 15 wherein providing to the second remote computer a plurality of document management services supported by the database further comprises providing a collaborative file sharing service.

17. The method of claim 11 further comprising filtering the electronic document before storing the document in the Internet-based store.

18. The method of claim 17 wherein filtering the electronic document comprises one or more of applying: compression, decompression, encryption, decryption, translation and formatting to the electronic document.

19. The method of claim 11 further comprising providing a customization function wherein a user is presented with corporate information corresponding to one of a plurality of service providers employing the document management system.

20. The method of claim 11 wherein the database further comprises an account information table including accounting data, the method further comprising applying the accounting data to the record in the transaction table to determine a price.

* * * * *